(12) United States Patent
Funayama et al.

(10) Patent No.: US 6,389,155 B2
(45) Date of Patent: *May 14, 2002

(54) IMAGE PROCESSING APPARATUS

(75) Inventors: Ryuji Funayama, Nara; Hajime Takezawa, Yamatokoriyama; Minehiro Konya, Daito; Mitsuhiro Hakaridani, Ikoma, all of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,919

(22) Filed: Jun. 16, 1998

(30) Foreign Application Priority Data

Jun. 20, 1997 (JP) .............................. 9-163890

(51) Int. Cl.⁷ ................................. G06K 9/00
(52) U.S. Cl. ................. 382/118; 382/282; 382/190; 345/628; 345/620
(58) Field of Search ................ 382/118, 173, 382/180, 115, 110, 216, 190, 103, 117, 119, 282, 288; 351/204; 345/620, 628

(56) References Cited

U.S. PATENT DOCUMENTS

| 4,975,969 A | * 12/1990 | Tal .................. 382/2 |
| 5,091,967 A | * 2/1992 | Ohsawa .............. 382/22 |
| 5,163,094 A | * 11/1992 | Prokoski et al. ........ 382/2 |
| 5,689,575 A | * 11/1997 | Sako et al. .......... 382/118 |
| 5,859,921 A | * 1/1999 | Suzuki .............. 382/118 |
| 5,982,912 A | * 11/1999 | Fukui et al. ......... 382/118 |
| 6,181,805 B1 | * 1/2001 | Koike et al. ......... 382/118 |

FOREIGN PATENT DOCUMENTS

| JP | 64-82854 A | 3/1989 |
| JP | 7-181012 A | 7/1995 |

OTHER PUBLICATIONS

Funayama et al, "Facial Component Extraction by Cooperative Active Nets with Global Constraints", IEEE Proceedings of ICPR '96, 1996, pp. 300–304.

Brunelli et al., "Face Recognition: Features versus Templates", IEEE Transactions on Pattern Analysis and Machine Intelligence, vol. 15, No. 10, Oct. 1993, pp. 1042–1052.

Yachida, "Robot Vision", publication date Oct. 30, 1990, partial English translation of pp. 44–45, 50–55, 66–69, 92–95.

Godlove, "Improved Color–Difference Formula, with Applications to the Perceptibility and Acceptability of Fadings", Journal of the Optical Society of America, vol. 41, No. 11, Nov. 1951, pp. 760–772.

* cited by examiner

Primary Examiner—Bhavesh Mehta
Assistant Examiner—Yosef Kassa
(74) Attorney, Agent, or Firm—Nixon & Vanderhye P.C.

(57) ABSTRACT

An image processing apparatus includes a designating section for designating an arbitrary region or an arbitrary position of an image; a specifying section for specifying an object region which is present in the designated region or position, and which can additionally be in a vicinity of the designated region or position, from pixel information in the designated region or position; a determining section for determining an image region to be cut out from the image, based on the specified object region; and a cutting section for cutting out the determined image region from the image.

26 Claims, 31 Drawing Sheets

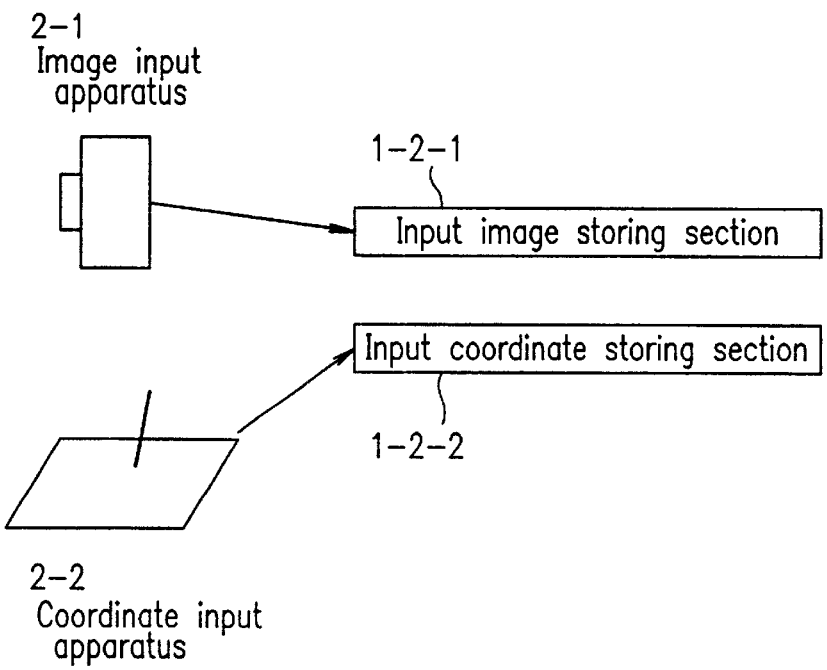
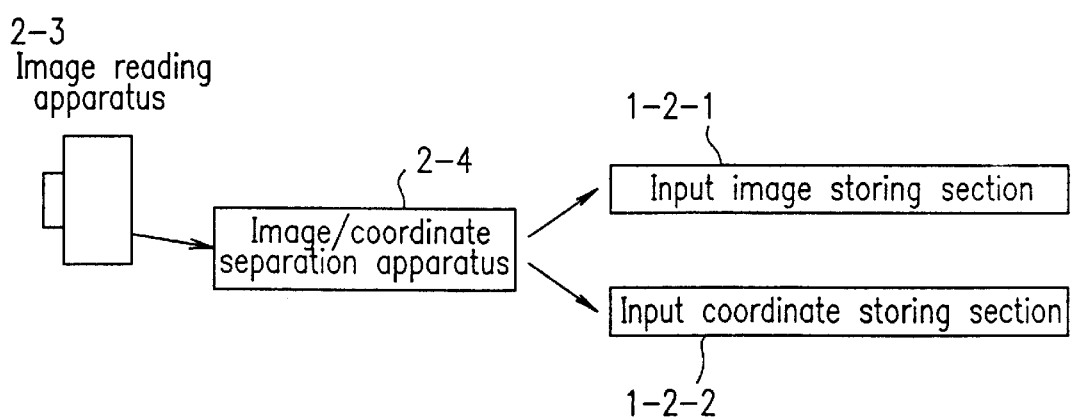

FIG.4
4-1
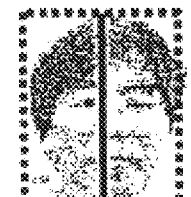
4-2
4-3
4-4
4-5
4-6
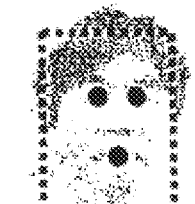
4-7
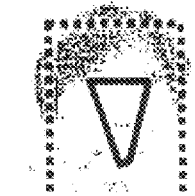
4-8
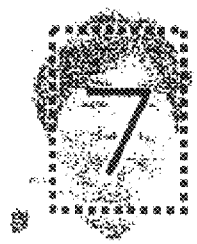
4-9
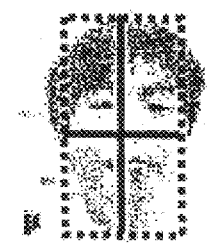
4-10
4-11
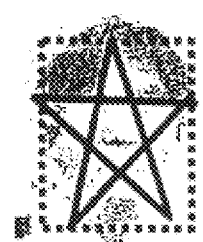
4-12
4-13
4-14

FIG.5
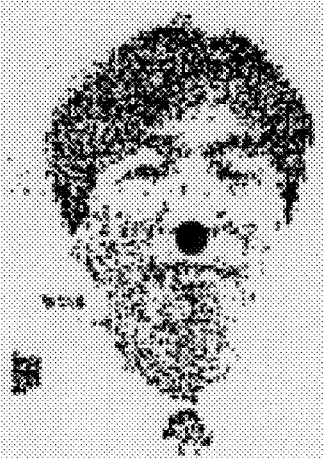
5-1
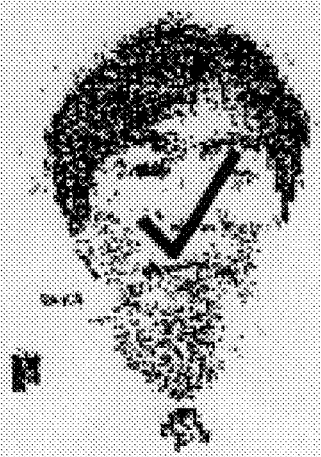
5-2

FIG. 9
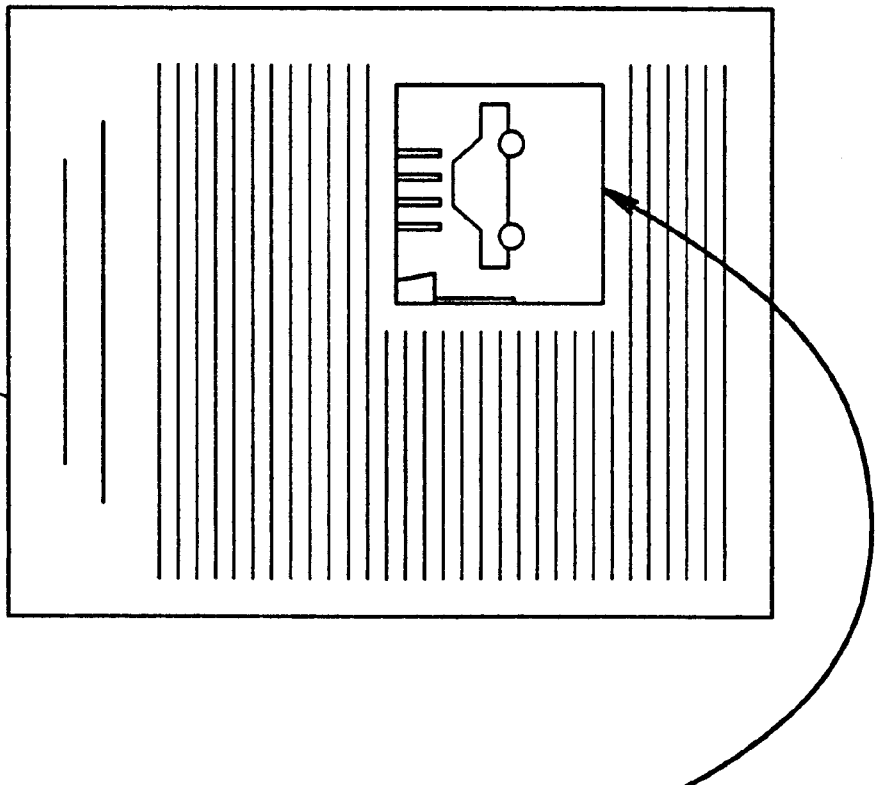
9-2 Report with attached image
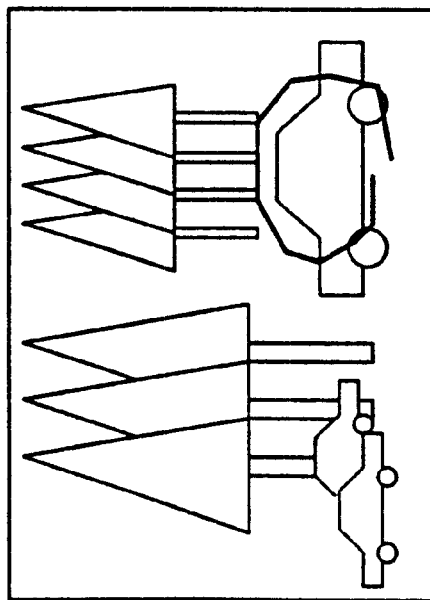
9-1 Image obtained by digital camera FIG.10
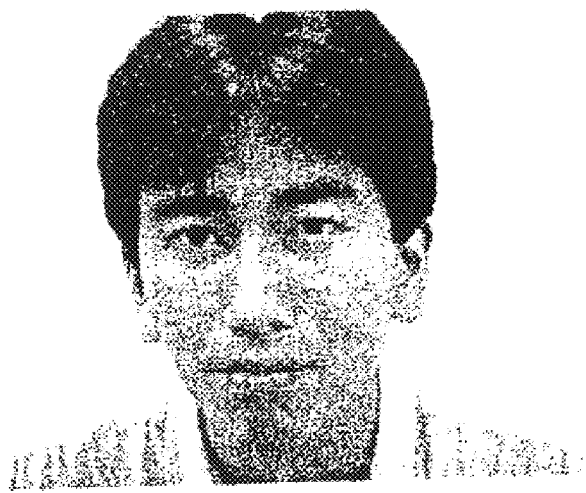
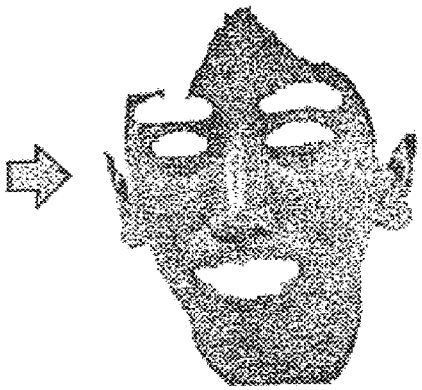
10-1
10-2

12-1   12-2   12-3

FIG.23
  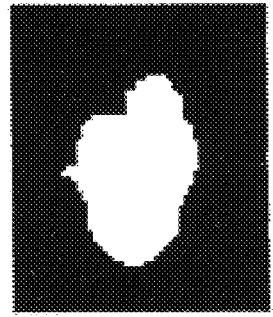
17-1    17-2    17-6
 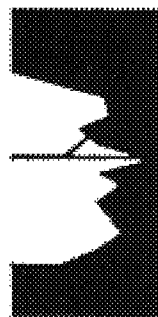 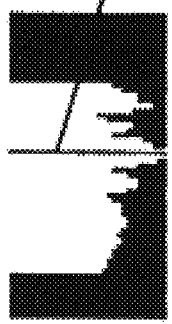 
18-1    18-2    18-1    18-4

FIG.31
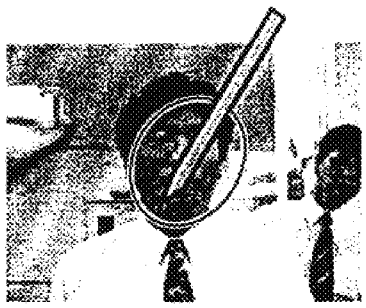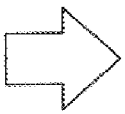
30-1
30-2

IMAGE PROCESSING APPARATUS

BACKGROUND OF THE INVENTION

1. Field of the Invention

The present invention relates to an image processing apparatus for use in computers for conducting image processing, word processors, portable information tools, copying machines, scanners, facsimiles or the like. More specifically, the present invention relates to an image processing apparatus enabling a user to designate the coordinates of any point on the image by a coordinate input apparatus such as a mouse, a pen or a tablet, or an image processing apparatus capable of photoelectrically converting a printed image on a piece of paper or the like with coordinates being designated in a different type of ink so as to input the image and the coordinates, wherein the image processing apparatus being capable of cutting out an object image with an arbitrary size at an arbitrary position from the original image.

2. Description of the Related Art

When an image including an object or a person's face of interest is cut out from the original image, the image is cut with a desired size using a pair of scissors, a cutter or the like, in the case of a photograph. In the case of an electronic image obtained by a CCD camera or a scanner, however, the positions of two points are designated by a coordinate input device such as a mouse, using software for image processing (e.g., the image processing software "PhotoShop" made by Adobe Inc.), and a rectangle having a diagonal between the two points is designated as a region.

In order to output a part of the original image, which includes an object of interest, as an image having a particular size, a portion having the object of interest at a well-balanced position is first cut out from the original image, and thereafter, is magnified/reduced to a required size. In the case of a photograph, such magnification/reduction is conducted by, for example, a copying machine. In the case of an electronic image, magnifying/reducing the image to a desired size can be easily carried out. However, cutting out a portion having the object of interest at a well-balanced position must be conducted before such magnification/reduction.

Furthermore, in order to extract a region representing a person's face except for hair (hereinafter, this portion is referred to as a "face skin") from the original image, a face skin region which is visually determined by an operator is painted out. In the case of an electronic image, a pixel is designated by a coordinate input device such as a mouse, and those pixels having a similar color to that of the designated pixel are combined to be extracted as one region (e.g., "PhotoShop" as mentioned above). There is also a method as follows: the color distribution of a face skin is analyzed in advance to set a probability density function. Then, the probability density of the input pixels is obtained using values such as RGB (red, green, blue) values and HSV (hue, color saturation, brightness) values as arguments, thereby designating those pixels having a probability equal to or higher than a prescribed value as a face-skin region (R. Funayama, N. Yokoya, H. Iwasa and H. Takemura, "Facial Component Extraction by Cooperative Active Nets with Global Constraints", Proceedings of 13th International Conference on Pattern Recognition, Vol. 2, pp. 300–305, 1996).

Conventionally, in the case where a rectangle including a face-skin region in the image is determined, the rectangle is commonly determined visually by an operator.

Moreover, the central axis of a person's face has been commonly detected based on the visual determination of an operator.

Another method for detecting the central axis of the face is as follows: a skin-color portion of the face is extracted as a region, and the region is projected to obtain a histogram. Then, the right and left ends of the face are determined from the histogram, whereby the line passing through the center thereof is determined as the central axis of the face (Japanese Laid-Open Publication No. 7-181012).

Furthermore, respective vertical positions of the nose, the eyes and the mouth on the face have been commonly detected based on the visual determination of an operator.

Another method is to match an image template of the nose with an input image (*Face Recognition: Features versus Templates*, by R. Brunelli and T. Poggio, IEEE Transactions on Pattern Analysis and Machine Intelligence, Vol.15, No.10, pp.1042–1052, 1993). In this article, a method for detecting the vertical positions by projecting a gray-level image or an edge image to obtain a histogram, and examining peaks and valleys of the histogram, has also been proposed.

Moreover, the width of the face has been commonly detected based on the visual determination of an operator.

Another method is as follows: a skin-color portion of the face is extracted as a region, and the region is projected to obtain a histogram. Then, the right and left ends of the face are determined from the histogram, whereby the distance between the ends is obtained as the width of the face (Japanese Laid-Open Publication No. 7-181012).

As described above, in order to output a part of the original image, which includes a person's face of interest, as an image having a particular size, a portion having the face at a well-balanced position is first cut out from the original image, and thereafter, is magnified/reduced to a required size. In the case of a photograph, such magnification/reduction is conducted by, for example, a copying machine. In the case of an electronic image, magnifying/reducing the image to a desired size can be carried out easily. However, cutting out a portion having the object of interest at a well-balanced position must be conducted before such magnification/reduction.

In the case of an electronic image, it is also possible for a user to adjust, in advance, the size of the face of the original image to an appropriate size, move a frame on the screen according to the visual determination of the user so that the face is located in the center, and output the image located within the frame. An apparatus achieving such an operation has been proposed in Japanese Laid-Open Publication No. 64-82854.

In order to achieve improved visual recognition of a person's face on a photograph or an image, the amount of exposure light for printing is adjusted in the case of a photograph. For an electronic image, there is software capable of conducting adjustment of contrast, tonality and brightness, edge sharpening, blurring processing and the like (e.g., "PhotoShop" as mentioned above).

When an image including an object or a person's face of interest is cut out from the original image, the image is cut with a desired size using a pair of scissors, a cutter or the like, in the case of a photograph. However, using a pair of scissors, a cutter or the like to cut an image is actually time-consuming. Moreover, cutting a portion including the object or the face of interest at a well-balanced position requires much skill. When software for processing an electronic image obtained by a CCD camera or converted by a scanner is utilized (e.g., "PhotoShop" as mentioned above), the positions of two points are usually designated by a coordinate input device such as a mouse, and a rectangle having a diagonal between the two points is designated as a region. In this case as well, cutting out a portion including an object or a face of interest at a well-balanced position requires much skill. Furthermore, in the case where an object or a face of interest is originally located at the edge of the screen, and a portion including the object or the face at a well-balanced position in the center is to be cut out from the image, it is necessary to first cut out the portion from the original image, and thereafter, move the position of the object or the face to the center of the resultant image.

As described above, in order to output a part of the original image, which includes an object of interest, as an image having a particular size, a portion having the object of interest at a well-balanced position is first cut out from the original image, and thereafter, is magnified/reduced to a required size. In the case of a photograph, such magnification/reduction is conducted by, for example, a copying machine. However, the image is not always cut to the same size. Therefore, in order to obtain an image with a desired size, a troublesome operation of calculating the magnification/reduction ratio is required. In the case of an electronic image, magnifying/reducing the image to a desired size is easy. However, cutting out a portion having the object of interest at a well-balanced position must be conducted before such magnification/reduction. In short, at least two operations are required to output an image having a particular size.

Furthermore, the above-mentioned method of painting out a visually determined face-skin region is troublesome regardless of whether an image to be processed is a photograph or an electronic image. Moreover, painting a portion at the boundary between the face skin region and the other regions must be conducted extremely carefully. In the case of an electronic image, the above-mentioned method of combining those pixels having similar color to that of the designated pixel to extract them as one region (e.g. "PhotoShop" as mentioned above) has been used. In this method, however, since the colors of the skin, the lip and the eyes are different, it is necessary to combine the results of several operations in order to extract the whole face-skin. Moreover, the skin color may be significantly uneven even in the same person due to, for example, different skin shades or shadows. In this case as well, the results of several operations must be combined. Also described above is the method of designating those pixels having a probability equal to or higher than a prescribed value as a face-skin region (the above-cited reference by R. Funayama, N. Yokoya, H. Iwasa and H. Takemura). According to this method, however, a face-skin region might not be successfully extracted in the case where the image's brightness is extremely uneven due to the photographing conditions or the conditions at the time of obtaining the image, or in the case where the color of the skin is different due to a racial difference.

As described above, when a rectangle including a face-skin region is to be obtained, the rectangle has been commonly determined visually by an operator. However, such a method is troublesome regardless of whether an image to be processed is a photograph or an electronic image.

Moreover, in the above-mentioned method of detecting the central axis of a person's face from a histogram (Japanese Laid-Open Publication No. 7-181012), the correct central axis can only be detected in the case where the face is completely directed to the front, while the correct central axis can not be obtained in the case where the face is turned even slightly to either side.

Furthermore, according to the above-mentioned method of matching an image template of the nose with an input image (the above-cited reference by R. Brunelli and T. Poggio), it is desirable that the size of the nose to be extracted is known. In the case where the size of the nose is not known, templates of various sizes must be matched with the input image, requiring substantial time for calculation. Moreover, according to the above-mentioned method of detecting the vertical positions by examining peaks and valleys of the histogram (the above-cited reference by R. Brunelli and T. Poggio), the vertical positions might not be correctly extracted, for example, in the case where the face skin region or the background is not known. In short, wrong extraction could occur without precondition.

Moreover, according to the above-mentioned method to detect a width of the face (Japanese Laid-Open Publication No. 7-181012), a face skin region should be correctly extracted based on the color information. However, in the case where a background region includes a color similar to that of the face skin, a region other than the face skin region might be determined as a face skin, or a shaded portion in the face skin region might not be determined as face skin. The detected width of the face might be different depending upon whether or not the ears can be seen on the image. Moreover, the detected width could be larger than the correct width in the case where the face is turned toward either side.

As described above, in order to output a part of the original image, which includes an object of interest, as an image having a particular size, a portion having the object of interest at a well-balanced position is first cut out from the image, and thereafter, is magnified/reduced to a required size. In the case of a photograph, such magnification/reduction is conducted by, for example, a copying machine. However, the image is not always cut to the same size. Therefore, in order to obtain an image with a desired size, a troublesome operation of calculating the magnification/reduction ratio is required. In the case of an electronic image, magnifying/reducing the image to a desired size can be easily carried out. However, cutting out a portion having the object of interest at a well-balanced position must be conducted before such magnification/reduction. In short, at least two operations are required to output an image having a particular size. According to a somewhat automated method as described in Japanese Laid-Open Publication No. 64-82854, the user adjusts, in advance, the size of the face of the original image to an appropriate size, moves a frame on the screen according to the visual determination of the user so that the face is located in the center, and output the image located within the frame. Alternatively, the user adjusts, in advance, the size of the face of the original image to an appropriate size, moves a T-shaped indicator on the screen according to the visual determination of the user so that the ends of the horizontal line of the T-shaped indicator overlap the eyes, respectively, and then, outputs an image within a rectangle defined with an appropriate margin from the T-shaped indicator.

The above-described operation of adjusting the amount of exposure light for printing in order to achieve improved visual recognition of a person's face on a photograph or an image requires much skill. For an electronic image, there is software capable of conducting adjustment of contrast, tonality and brightness, edge sharpening, blurring processing and the like (e.g., "PhotoShop" as mentioned above), as described above. In this case as well, using such software requires much skill, and usually, various operations must be tried until a desired image is obtained.

SUMMARY OF THE INVENTION

According to one aspect of the present invention, an image processing apparatus includes a designating section for designating an arbitrary region or an arbitrary position of an image; a specifying section for specifying an object region which is present in the designated region or position, and which can additionally be in a vicinity of the designated region or position, from pixel information in the designated region or position; a determining section for determining an image region to be cut out from the image, based on the specified object region; and a cutting section for cutting out the determined image region from the image.

In one example, the determining section includes a section for adjusting a size of the image region to a prescribed size.

In one example, the determining section includes a correcting section for entirely correcting the designated image region or correcting only a part of the designated image region.

According to another aspect of the present invention, an image processing apparatus includes a designating section for designating an arbitrary region or an arbitrary position of an image; an analyzing section for analyzing a color distribution in the designated region or position and in a vicinity of the designated region or position; a adjusting section for adjusting a condition for specifying a face image which is present in the image, according to a result of the analysis; a specifying section for specifying a face image region which is present in the designated region or position, and which can additionally be in the vicinity of the designated region or position, based on the adjusted condition; a determining section for determining an image region to be cut out from the image, based on the specified face image region; and a cutting section for cutting out the determined image region from the image.

In one example, the determining section includes a section for adjusting a size of the image region, using the region or the position designated by the designating section as a reference.

In one example, the specifying section includes a section for applying noise elimination or labelling to the specified face image region to produce a face mask; a section for vertically scanning the produced face mask to obtain a sum of vertical differential luminance values of pixels in the image corresponding to the face mask to produce a histogram; and a section for detecting a central axis of a face from a profile of the produced histogram.

In one example, the specifying section includes a section for applying noise elimination or labelling to the specified face image region to produce a face mask; a section for vertically scanning the produced face mask to obtain a mean luminance value of pixels in the image corresponding to the face mask to produce a histogram; and a section for detecting a vertical nose position from a profile of the produced histogram.

In one example, the specifying section includes a section for applying noise elimination or labelling to the specified face image region to produce a face mask; a section for horizontally scanning the produced face mask to obtain a mean luminance value of pixels in the image corresponding to the face mask to produce a histogram; and a section for detecting a vertical eye position from a profile of the produced histogram.

In one example, the specifying section includes a section for applying noise elimination or labelling to the specified face image region to produce a face mask; a section for horizontally scanning the produced face mask to obtain a mean luminance value of pixels in the image corresponding to the face mask to produce a histogram; and a section for detecting a vertical mouth position from a profile of the produced histogram.

In one example, the specifying section further includes a section for detecting a vertical eye position from the profile of the produced histogram; and a section for obtaining a middle position of a region between the detected vertical eye position and the detected vertical mouth position to detect a width of the face mask at the middle position.

In one example, the determining section includes a section for adjusting a position of the image region, based on the face image region, a central axis of a face in the face image, a vertical nose position of the face in the face image, a vertical eye position of the face in the face image, a vertical mouth position of the face in the face image, and a width of a face mask of the face image.

In one example, the determining section includes a section for adjusting a size of the image region, based on the face image region, a central axis of a face in the face image, a vertical nose position of the face in the face image, a vertical eye position of the face in the face image, a vertical mouth position of the face in the face image, and a width of a face mask of the face image.

In one example, the determining section includes a correcting section for entirely correcting the designated image region or correcting only a part of the designated image region.

Thus, the invention described herein makes possible the advantage of providing an image processing apparatus capable of photoelectrically converting a printed image on a piece of paper or the like with coordinates being designated in a different type of ink so as to input the image and the coordinates, wherein the image processing apparatus being capable of cutting out an object image with an arbitrary size at an arbitrary position from the original image.

This and other advantages of the present invention will become apparent to those skilled in the art upon reading and understanding the following detailed description with reference to the accompanying figures.

BRIEF DESCRIPTION OF THE DRAWINGS

FIG. 2 is a block diagram showing an image/coordinate input apparatus in the image processing apparatus shown in FIG. 1;

FIG. 3 is a block diagram showing another image/coordinate input apparatus in the image processing apparatus shown in FIG. 1;

FIG. 4 shows examples of a region of an object or a face in the image designated by the user;

FIG. 5 shows examples of a position of the object or a face in the image designated by the user;

FIG. 9 is a diagram illustrating how a part of an image is attached to a document;

FIG. 10 is a diagram illustrating an example of extracting only a face-skin portion from the image including a person's face;

FIG. 23 is a diagram illustrating the process for detecting the vertical position of the nose;

FIG. 31 shows a sheet of an address book with a face image being attached thereto.

DESCRIPTION OF THE PREFERRED EMBODIMENTS

Figure 1:
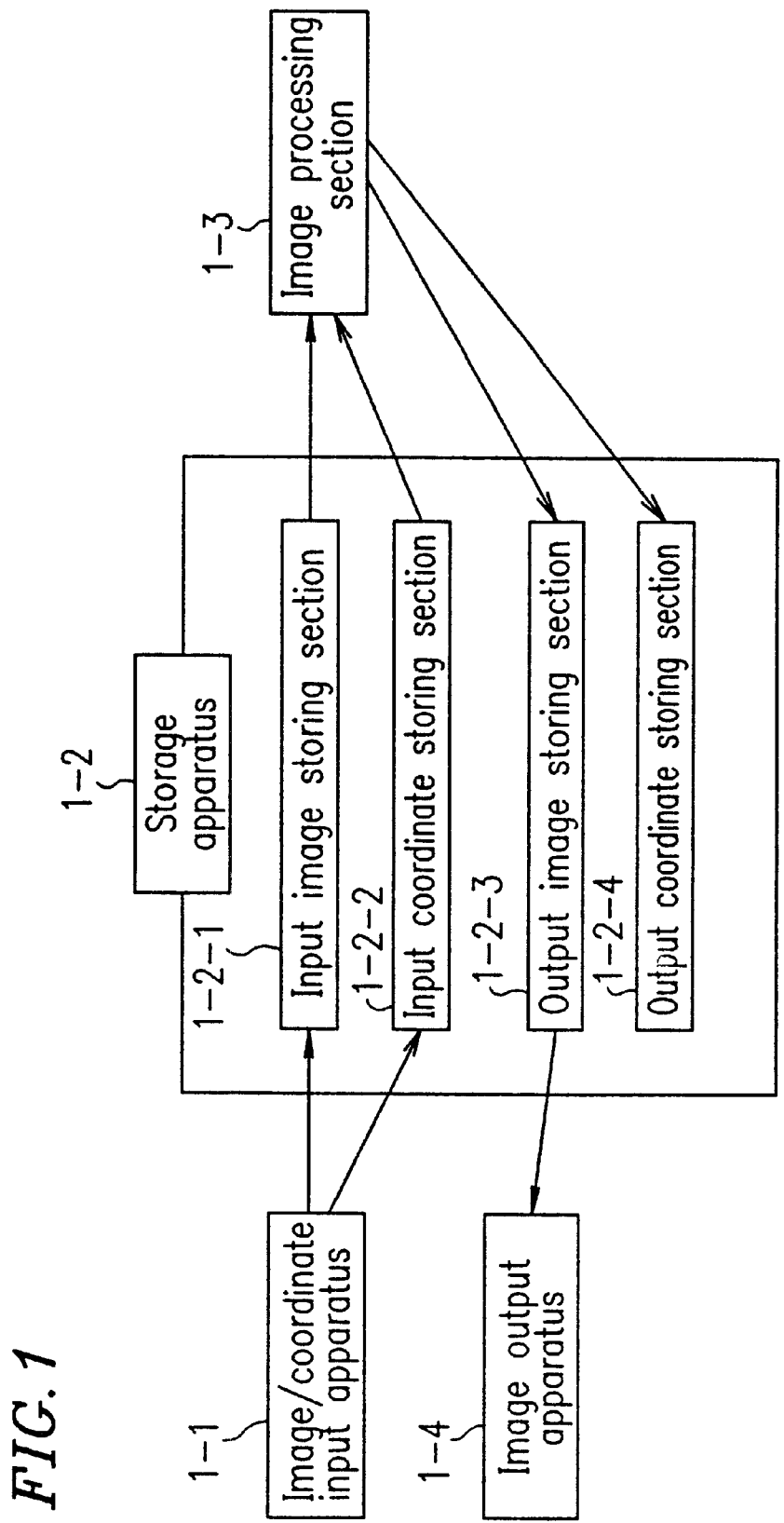
FIG. 1 is a block diagram showing an image processing apparatus according to one example of the present invention.

Hereinafter, the present invention will be described by way of illustrative examples with reference to the accompanying drawings. The same reference numerals designate the same component.

FIG. 1 is a block diagram showing an image processing apparatus according to one example of the present invention. An image to be processed and coordinates required for the processing are input by an image/coordinate input apparatus 1-1. In the case where the image is in a digital form, the image is directly stored in an input image storing section 1-2-1 of a storage apparatus 1-2. In the case where the input image is an analog form, the image is converted into a digital form, and the resultant image is stored in the input image storing section 1-2-1. The input coordinates are stored in an input coordinate storing section 1-2-2. An image processing section 1-3 uses the stored image and coordinates as input information to conduct an appropriate image processing in an operation region of a memory within the image processing section 1-3. Thereafter, the image processing section 1-3 stores the resultant image and coordinates in an output image storing section 1-2-3 and an output coordinate storing section 1-2-4 of the storage apparatus 1-2, respectively. After undergoing processing, the resultant image can be sent to an image output apparatus 1-4, whereby a copy of the resultant image can be made.

FIGS. 2 and 3 are diagrams illustrating in detail the image/coordinate input apparatus 1-1 shown in FIG. 1.

The image/coordinate input apparatus 1-1 in FIG. 1 separately includes an image input apparatus 2-1 and a coordinate input apparatus 2-2, as shown in FIG. 2. The input image from the image input apparatus 2-1 is stored in the input image storing section 1-2-1 of the storage apparatus 1-2, whereas the input coordinates from the coordinate input apparatus 2_2 are stored in the input coordinate storing section 1-2-2 of the storage apparatus 1-2. For example, a camera capable of directly inputting a digitized image by a solid-state image sensing device (CCD; charge coupled device); an apparatus capable of digitizing a photograph or a scanner which can input printed matters; or an apparatus for holding a digitized image such as equipment connected to a network, like the internet, and a magnetic storage apparatus may be used as the image input apparatus 2-1. As the coordinate input apparatus 2-2, a mouse capable of inputting coordinates with a pointer displayed on a display, a track ball, a pen-type apparatus, a pen-type coordinate input apparatus using a tablet, a coordinate input apparatus using a finger, or the like may be used.

The image/coordinate input apparatus 1-1 in FIG. 1 includes an image reading apparatus 2-3 and an image/coordinate separation apparatus 2-4, as shown in FIG. 3. This type of the image/coordinate input apparatus 1-1 is used in the case where both an image including an object to be processed and input coordinates are present on a single image. For example, in the case where a line or a point representing the coordinates is drawn in a particular color on a photograph, only a component of that color is extracted to obtain a separate image. Thereafter, the position of the point or the line is analyzed from the separate image, whereby the coordinates are extracted.

FIG. 4 shows examples of a region of the object in the image designated by the user. First, an image and a pattern indicated by a solid line or points, as shown in FIG. 4, are input to the image/coordinate input apparatus 1-1 (FIG. 1). In the case of a rectangular pattern 4-1, the coordinates of two points, that is, the coordinates of the upper left point and the lower right point of the pattern are used as the input coordinates. In the case of a pattern 4-4, 4-10, 4-11, 4-12, 4-13 or 4-14, the coordinates of the upper left point and the lower right point of a rectangle circumscribing the input pattern (i.e., such a rectangle as shown by a dotted line on each image) are used as the input coordinates. In the case of the other patterns, two coordinates defining a rectangle circumscribing the input pattern can be used as the input coordinates. However, in the case of a line or dot pattern, that is, in the case of a pattern 4-2, 4-3, 4-5 or 4-6, no rectangle circumscribing the pattern could be obtained. Otherwise, such a rectangle that has an extremely large aspect ratio would be obtained. In such a case, an appropriate rectangle will be set according to a mean aspect ratio of the object (this rectangle will be set as a square when the object is not known). In the case of a pattern 4-2, for example, the object is a person's face and a rectangle circumscribing the input pattern is extremely long in the longitudinal direction (or the input pattern is a vertical straight line and no rectangle circumscribing the input pattern can be obtained). In such a case, a rectangle as shown by a dotted line is set. In other words, a rectangle horizontally magnified/reduced from the rectangle circumscribing the input pattern is obtained by multiplying the length of the rectangle circumscribing the input pattern by a prescribed ratio. Furthermore, the coordinates of the upper left point and the lower right point are used as the input coordinates. In the case of a pattern 4-7, 4-8 or 4-9, a rectangle longitudinally and laterally magnified from the rectangle circumscribing the input pattern by respective prescribed ratios is set, and the coordinates of two points of the rectangle are used as the input coordinates.

FIG. 5 shows examples of a position of the object designated by the user. In the case where the user designates a point such as a pattern 5-1, the coordinates of that point can be used as the input coordinates. In the case where the user designates a pattern other than the point such as a pattern 5-2, the center of a circumscribed rectangle can be used as the input coordinates.

[Image processing procedure 1]

Figure 7:
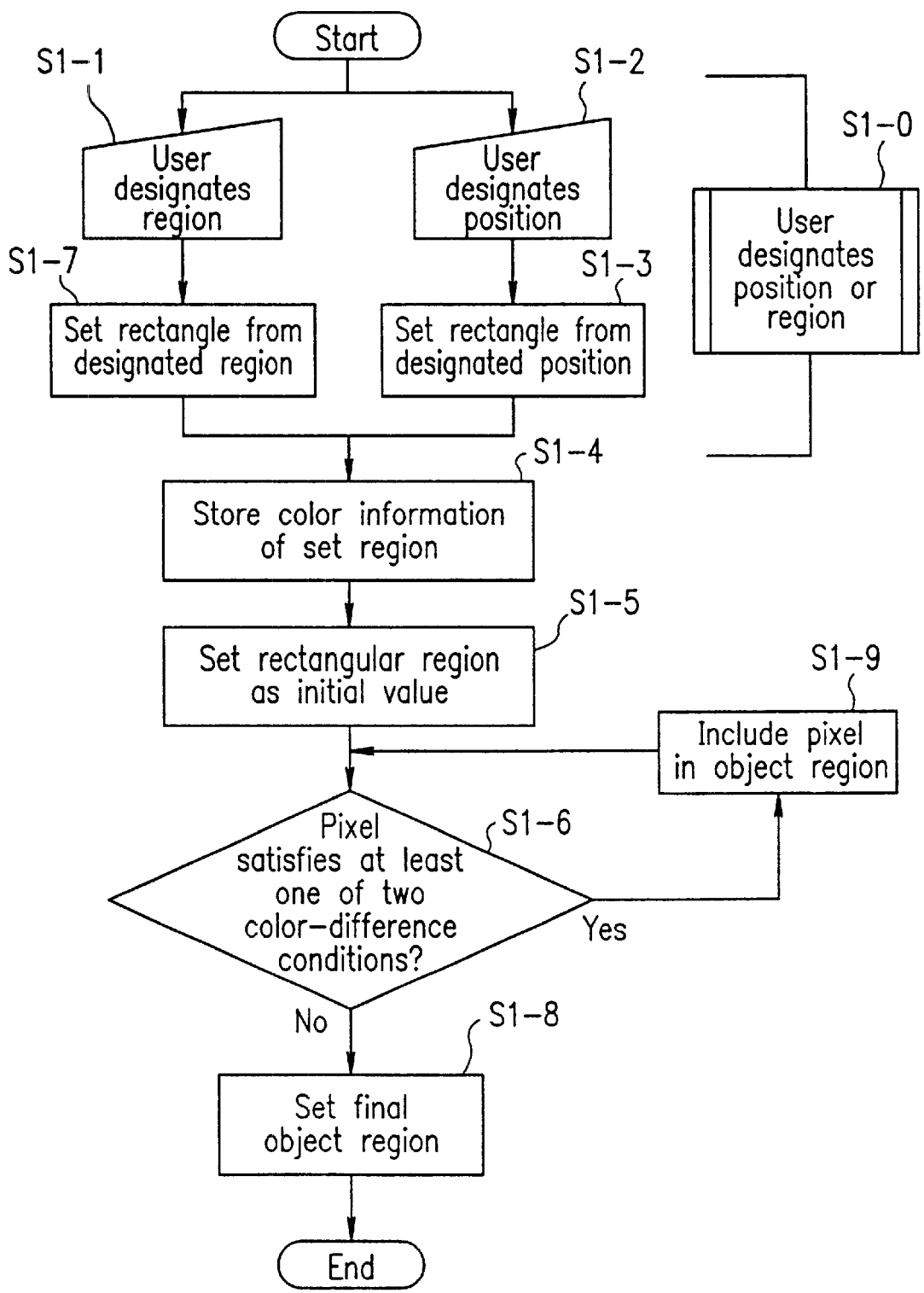
FIG. 7 is a flow chart illustrating Image processing procedure 1 conducted by the image processing apparatus of the example shown in FIG. 1.

Image processing procedure 1 conducted by the image processing apparatus of the present example will now be described with reference to the flow chart of FIG. 7.

Figure 6A:
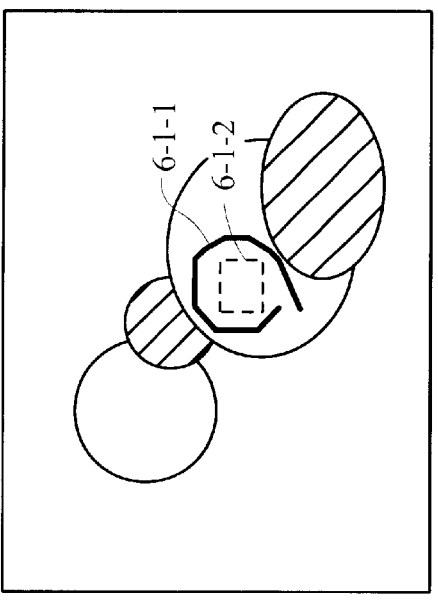
FIGS. 6A through 6D show images illustrating the steps from the user's designation to the extraction of an image.
Figure 6B:
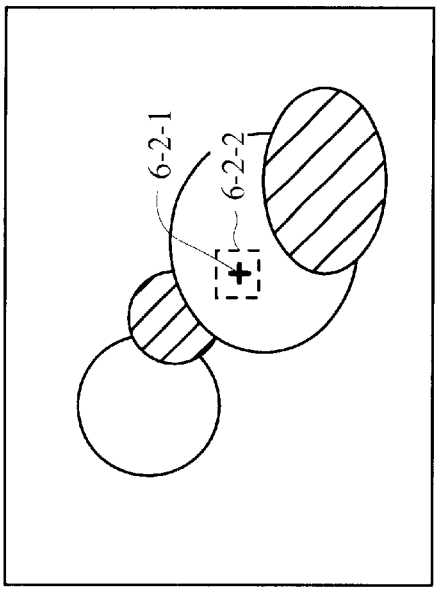

First, using the image/coordinate input apparatus 1-1 (FIG. 1), the user roughly designates a region of the object in the image stored in the input image storing section 1-2-1, as shown in FIG. 4, or roughly designates a position of the object, as shown in FIG. 5. FIGS. 6A through 6D show images illustrating the steps from the user's designation to the extraction of an image. When a region 6-1-1 is designated by the user (Step S1-1), as shown in FIG. 6A, the image processing section 1-3 obtains a rectangular region 6-1-2 reduced from the rectangle circumscribing the input pattern by an appropriate ratio, and stores the region 6-1-2 as a set region in the input coordinate storing section 1-2-2 (Step S1-7). As shown in FIG. 6B, when a position 6-2-1 is designated by the user (Step S1-2), the image processing section 1-3 obtains an appropriate rectangular region 6-2-2 centered around the designated position 6-2-1 (Step S1-3), and stores the region 6-2-2 in the input coordinate storing section 1-2-2 (Step S1-7).

The image processing section 1-3 (FIG. 1) utilizes the operation region of the memory within the image processing section 1-3 to store the color information of the pixels included in the rectangular region 6-1-2 or 6-2-2 (Step S1-4), and sets the rectangular region 6-1-2 or 6-2-2 as an initial value of the object region (Step S1-5).

Figure 8:
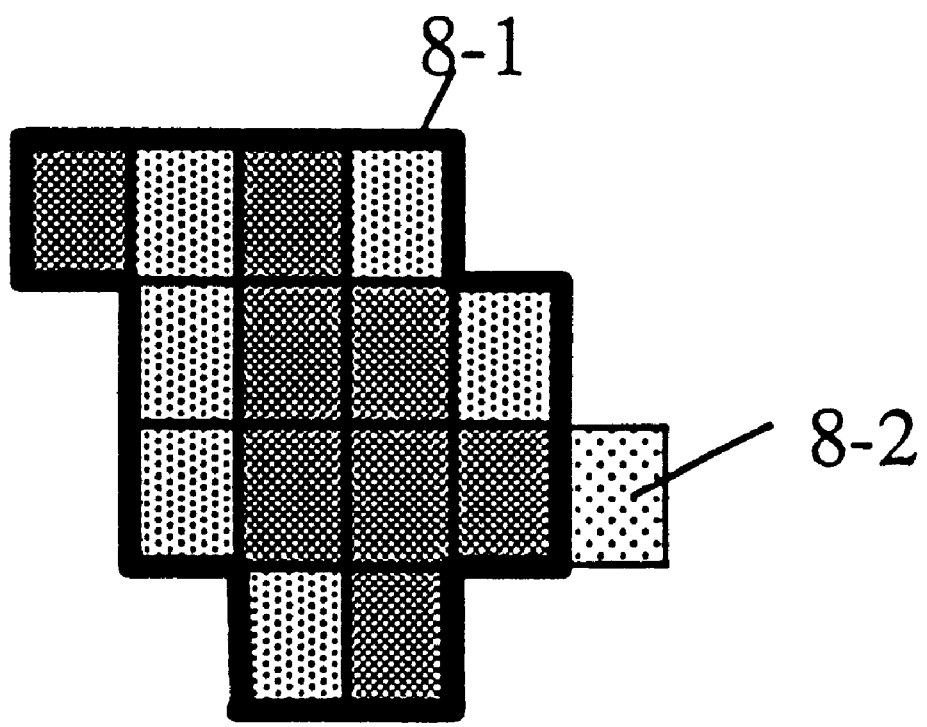
FIG. 8 is a diagram showing the pixels of an object region.

FIG. 8 shows the pixels in the object region. The image processing section 1-3 finds a pixel 8-2 adjacent to the object region 8-1. When the pixel 8-2 satisfies at least one of the following two conditions (Step S1-6), the pixel 8-2 is added to the object region (Step S1-9):

1. the color difference between the pixel of interest and an adjacent pixel in the object region is within a prescribed range; and/or
2. the color difference between the pixel of interest and a pixel stored in Step S1-4 is within a prescribed range.

Figure 6C:
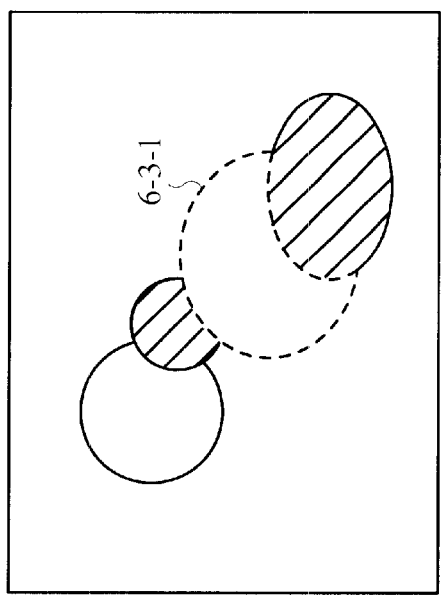

The image processing section 1-3 examines all of the pixels adjacent to the object region in terms of the above two conditions. This operation is repeated until no pixel can be added to the object region. Then, as shown in FIG. 6C, the image processing section 1-3 obtains a final object region 6-3-1 (Step S1-8). It should be noted that, although various indices of the color difference have been proposed, a Godlove's color-difference formula as shown in "Improved Color-Difference Formula with Applications to the Perceptibility and Acceptability of Fadings", I. H. Godlove, J. Opt. Soc. Am., 41, 11, pp. 760–772, 1951 may be used.

Figure 6D:
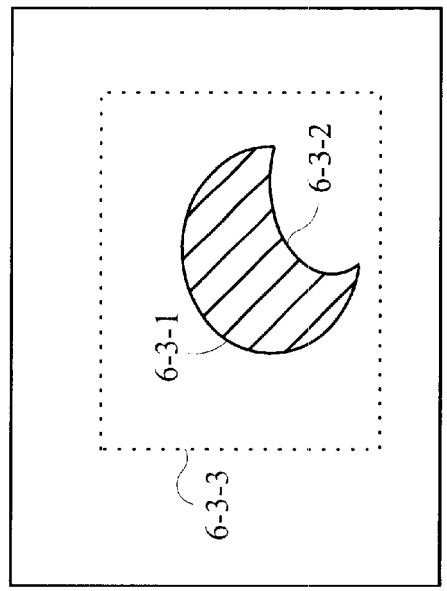

The image processing section 1-3 expresses the area of the object region 6-3-1 as the number of pixels included in the object region 6-3-1. Then, as shown in FIG. 6D, the image processing section 1-3 obtains a rectangular region 6-3-3 centered around the center of gravity of the object region 6-3-1 and having an area corresponding to a prescribed percentage (e.g., 30%) of the total area of the rectangular region 6-3-3. Thereafter, the image processing section 1-3 cuts out the rectangular region 6-3-3 from the original image. The shape of the rectangular region 6-3-3 may be square. Alternatively, the shape of the rectangular region 6-3-3 may be set as appropriate depending upon applications. For example, the rectangular region 6-3-3 may be set to have a ratio of 4:3 according to the aspect ratio of a television screen, or may be set to have a ratio of 16:9 according to the aspect ratio of a high-definition television screen. It should be noted that, although the rectangular region is centered around the center of gravity of the object region in the above description, the position of the center of gravity in the rectangular region may be shifted longitudinally and laterally depending upon the application.

A method for obtaining the center of gravity is described in, for example, "Robot Vision" by M. Yachida, Shohkohdo, ISBN4-7856-3074-4 C3355, 1990. A part of the image can be cut out from the original image, based on the coordinates of the rectangular region.

[Image processing procedure 2]

The image processing section 1-3 magnifies or reduces the image which has been cut out according to Image processing procedure 1, to an appropriate size, and stores the resultant image in the output image storing section 1-2-3 of the storage apparatus 1-2. The image processing section 1-3 may utilize the stored image for any appropriate applications. For example, an image 9-1 including an automobile and obtained by a digital camera, as shown in FIG. 9, is stored in the input image storing section 1-2-1. Then, a part of the image including only the automobile is cut out from the input image. Thereafter, this part of the image is attached to a report 9-2 having a prescribed format and a frame for a prescribed image size. The resultant report 9-2 is stored in the output image storing section 1-2-3.

[Image processing procedure 3]

Before Image processing procedure 3, the color distribution of a person's face skin is analyzed in advance according to the following procedures:

1. the face-skin portion is manually extracted from a face image 10-1 to produce a face-skin image 10-2 (FIG. 10);
2. a face-skin image is similarly produced for a plurality of different persons;
3. frequency histograms are plotted with respect to the hue (FIG. 11A, 11-1-1), color saturation (FIG. 11B, 11-2-1) and brightness (FIG. 11C, 11-3-1) of the pixels of each of the face-skin images to obtain the color distribution; and
4. for each histogram, the mean and variance of the distribution are obtained, and such a normal probability density function (11-1-2, 11-2-2, 11-3-2) that best fits the distribution is obtained.

Thus, the color distribution of the face skin can be expressed by the normal probability density functions ($P_{hue}$(hue), $P_{sat}$(sat) and $P_{val}$(val)) of the hue, color saturation and brightness, each function having two arguments: the mean and variance ($\mu_{hue}$, $\sigma^2_{hue}$; $\mu_{sat}$, $\sigma^2_{sat}$; and $\mu_{val}$, $\sigma^2_{val}$, respectively). In this specification, each of the normal probability density functions is referred to as a skin-region probability density function. Each skin-region probability density function is expressed by the following expressions:

$$P_{hue}(\text{hue}) \sim N(\mu_{hue}, \sigma^2_{hue}) \quad (1)$$

$$P_{sat}(\text{sat}) \sim N(\mu_{sat}, \sigma^2_{sat}) \quad (2)$$

$$P_{val}(\text{val}) \sim N(\mu_{val}, \sigma^2_{val}) \quad (3)$$

Figure 11A:
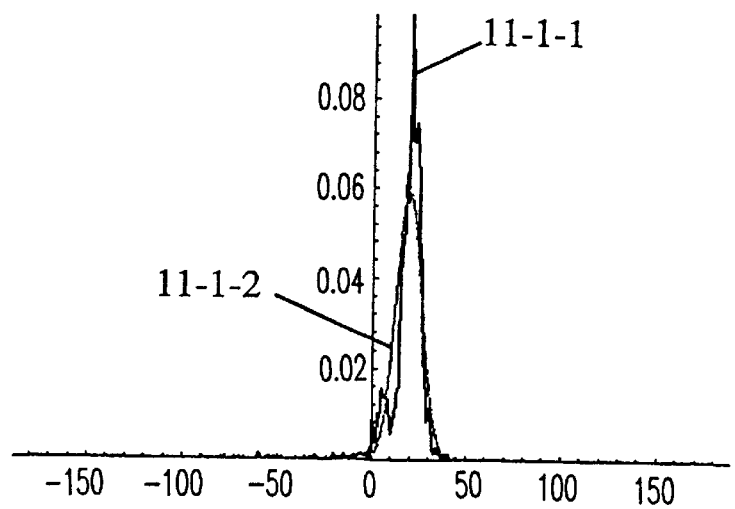
FIGS. 11A, 11B and 11C show the frequency histograms plotted with respect to the hue, color saturation and brightness, respectively.
Figure 11B:
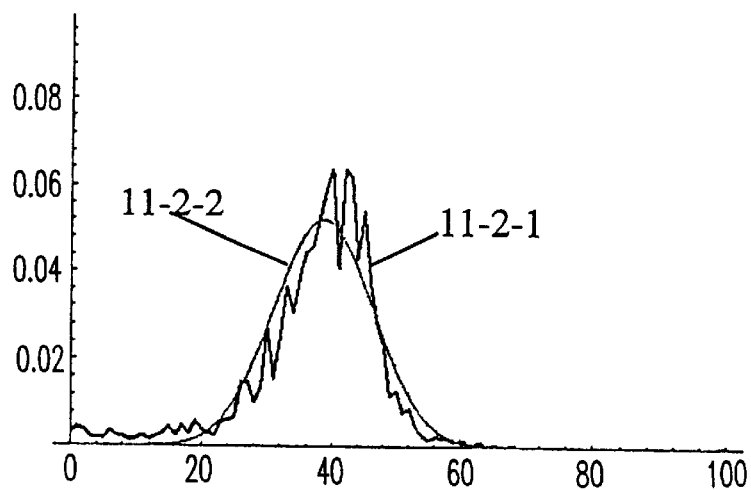
Figure 11C:
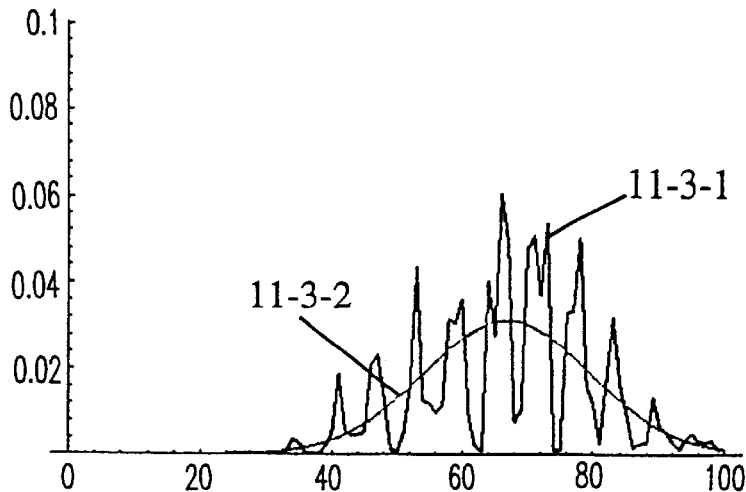

When the calculated mean and variance are applied to the normal distribution, those values which are significantly different from a mean value, if any, would result in a greater estimation of the variance than the actual variance. Even a few values would cause such an estimation. For example, in the case of the hue distribution histogram as shown in FIG. 11A, most of the pixels are distributed within about ±30 of about 20. In this histogram, values such as 100 and −150 would result in a grater estimation of the variance. Therefore, in order to obtain a normal distribution curve (a probability density function) which can be applied to a more accurate distribution, it would be better to first remove those pixels having such values, and thereafter, calculate the mean and variance.

Figure 12:
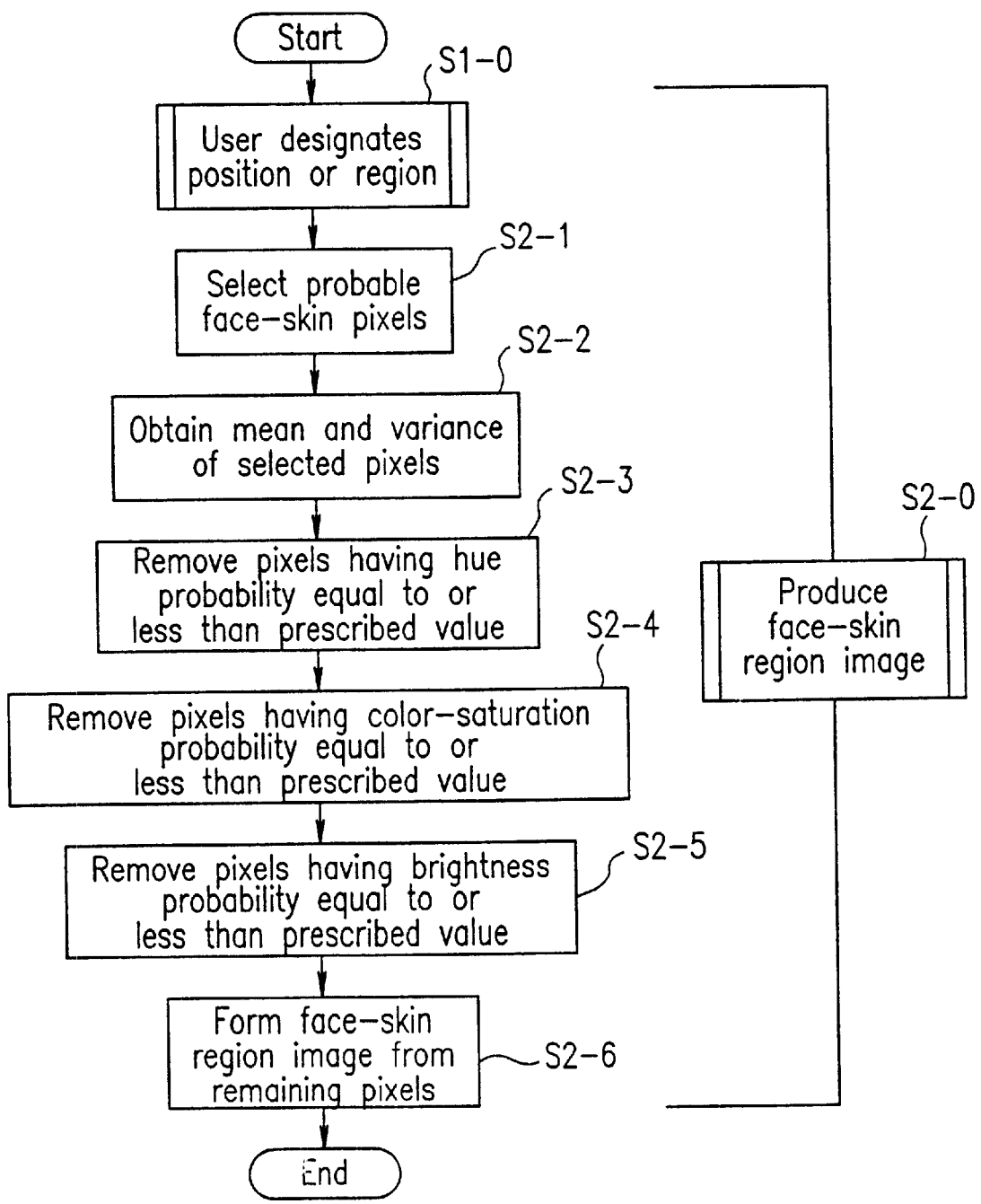
FIG. 12 is a flow chart illustrating Image processing procedure 3 for producing an image representing a face skin region.
Figure 13A:
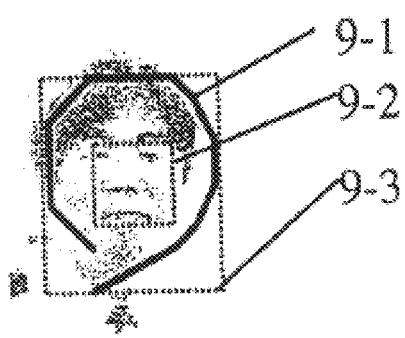
FIGS. 13A and 13B show input patterns designated by the user.
Figure 13B:
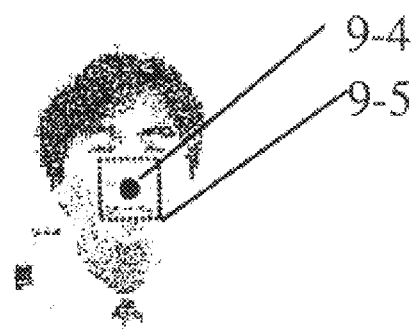

The image processing section 1-3 stores each of the normal probability density functions in advance, and processes the image stored in the input image storing section 1-2-1 according to the flow chart of FIG. 12. In Step S1-0, the image processing section 1-3 sets an original processing region, based on the user input. In the case where a pattern (region) 9-1 as shown in FIG. 13A is input from the image/coordinate input apparatus 1-1 to the input coordinate storing section 1-2-2, the image processing section 1-3 sets a processing region 9-2 of the image stored in the input image storing section 1-2-1 in such a way as described above. In the case where a pattern (position) 9-4 as shown in FIG. 13B is input, the image processing section 1-3 sets a processing region 9-5 (Step S1-0). The image processing section 1-3 substitutes a hue value, a color-saturation value and a brightness value of each pixel in the respective normal probability density functions obtained as described above, so as to obtain the respective probabilities. Such a pixel that has a value equal to or higher than a prescribed probability with respect to each of the hue, color saturation and brightness is determined as an original probable face-skin pixel (Step S2-1). At this time, the prescribed probability should be set to a small value such as 5% so that as many pixels as possible may be selected as a probable face-skin pixel. Thus, any pixels which possibly correspond to the face-skin portion are determined as original probable face-skin pixels. Thereafter, the image processing section 1-3 calculates the mean and variance of each of the hue, color saturation and brightness (Step S2-2). In the foregoing description, an original probable face-skin pixel is selected based on the probabilities of the hue, color saturation and brightness. However, it may also be effective to adjust each threshold to a value close to the pixel value of the above-mentioned prescribed probability, depending upon the characteristics of an imaging system.

Provided that the mean and variance of the hue, color distribution and brightness thus calculated are $\mu'_{hue}$, $\sigma^{2'}_{hue}$; $\mu'_{sat}$, $\sigma^{2'}_{sat}$; and $\mu'_{val}$, $\sigma^{2'}_{val}$, respectively, corresponding probability density functions $P'_{hue}$(hue), $P'_{sat}$(sat) and $P'_{val}$(val) having these arguments can be expressed by the following expressions:

$$P'_{hue}(\text{hue}) \sim N(\mu'_{hue}, \sigma^{2'}_{hue}) \quad (4)$$

$$P'_{sat}(\text{sat}) \sim N(\mu'_{sat}, \sigma^{2'}_{sat}) \quad (5)$$

$$P'_{val}(\text{val}) \sim N(\mu'_{val}, \sigma^{2'}_{val}) \quad (6)$$

Using these probability density function, the image processing section 1-3 selects face-skin pixels according to the following procedures:

1. first, all of the pixels in the image are set as initial values, and any pixels having a value equal to or lower than a prescribed probability ($P'_{hue}$(hue)) calculated from a hue value as an argument are removed (Step S2-3);
2. next, any pixels having a value equal to or lower than a prescribed probability ($P'_{sat}$(sat)) calculated from a color-saturation value as an argument are removed (Step S2-4); and
3. finally, any pixels having a value equal to or lower than a prescribed probability ($P'_{val}$(val)) calculated from a brightness value as an argument are removed (Step S2-5).

As a result, a face-skin region is specified (Step S2-6).

The lower limit of each probability is set higher than they were set when the original probable face-skin pixels were obtained. For example, provided that the previous threshold of the probability is 5% as described above, the threshold may be set to 30%. As a result, more accurate extraction can be carried out. More specifically, any pixels that have been wrongly extracted as not being noise based on the 5% threshold, would be removed based on the 30% threshold.

Figure 14A:
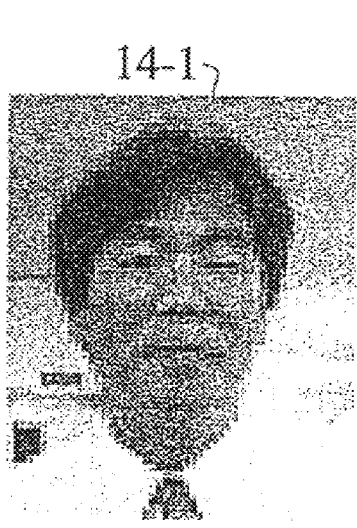
FIG. 14A shows an example of the image.
Figure 14B:
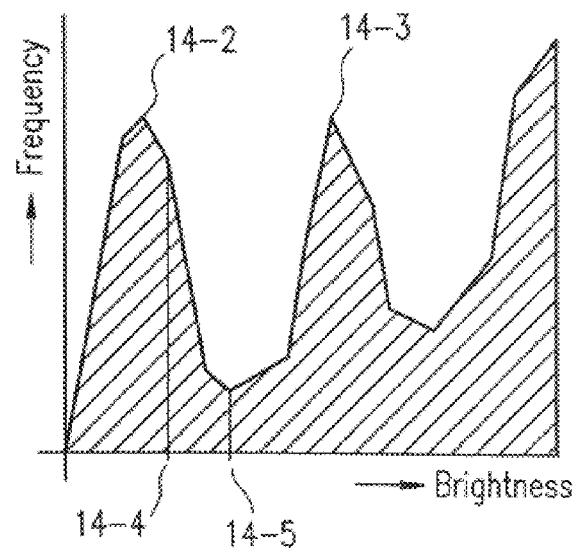
FIG. 14B is a graph showing the relationship between brightness and frequency of the image of FIG. 14A.

In the foregoing description, selection of the pixels corresponding to the face-skin portion is conducted based on the probabilities. However, it may also be effective to adjust each threshold to a value close to the pixel value of the above-mentioned prescribed probability, depending upon the characteristics of an imaging system. For example, as can be seen from FIG. 14A, the face skin and the hair of an image 14-1 have different brightnesses. FIG. 14B is a histogram showing the brightness versus frequency of the image of FIG. 14A. As shown in FIG. 14B, a peak 14-2 representing the hair appears at a lower value of the brightness, whereas a peak 14-3 representing the face-skin region appears at a relatively higher value of the brightness. Provided that a peak value is simply selected as a threshold of the brightness probability of the image 14-1, the peak value 14-2 might be set as a threshold, whereby those pixels corresponding to a part of the hair might be selected as the pixels corresponding to the face skin. In such a case, such an algorithm as an Ohtsu's discriminant analysis method (which is described in the above-cited reference: "Robot Vision" by M. Yachida) may be applied to a value equal to or lower than an appropriate brightness value to set a more appropriate value 14-5 as the brightness threshold.

Figure 15:
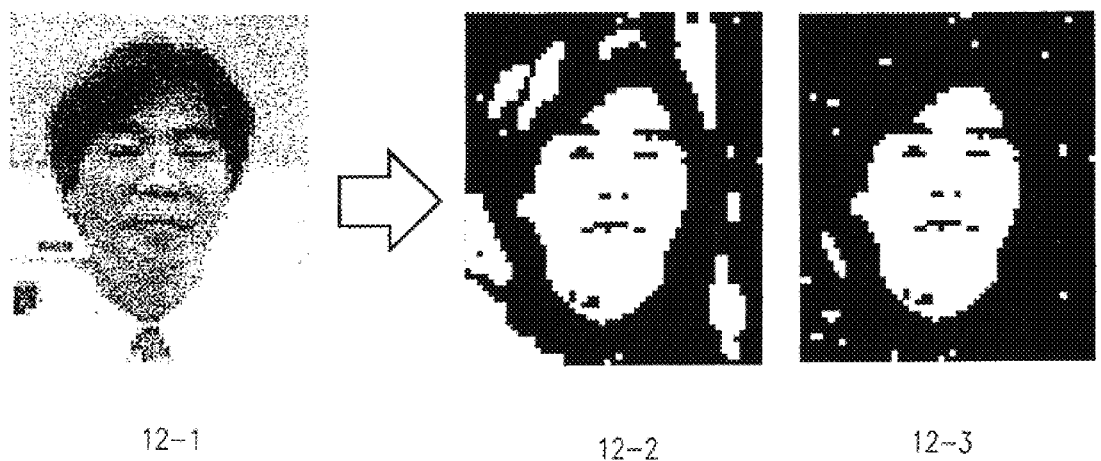
FIG. 15 is a diagram illustrating an example of extracting only a face skin portion from the image including a person's face.

By updating the skin region probability density functions as appropriate in such a manner as described above, an image 12-3 representing a face-skin region can be obtained from an image 12-1, as shown in FIG. 15 (Step S2-6). The image 12-3 thus obtained has a smaller amount of noise, as compared to an image 12-2 conventionally extracted using a fixed function.

[Image processing procedure 4]

Figure 16:
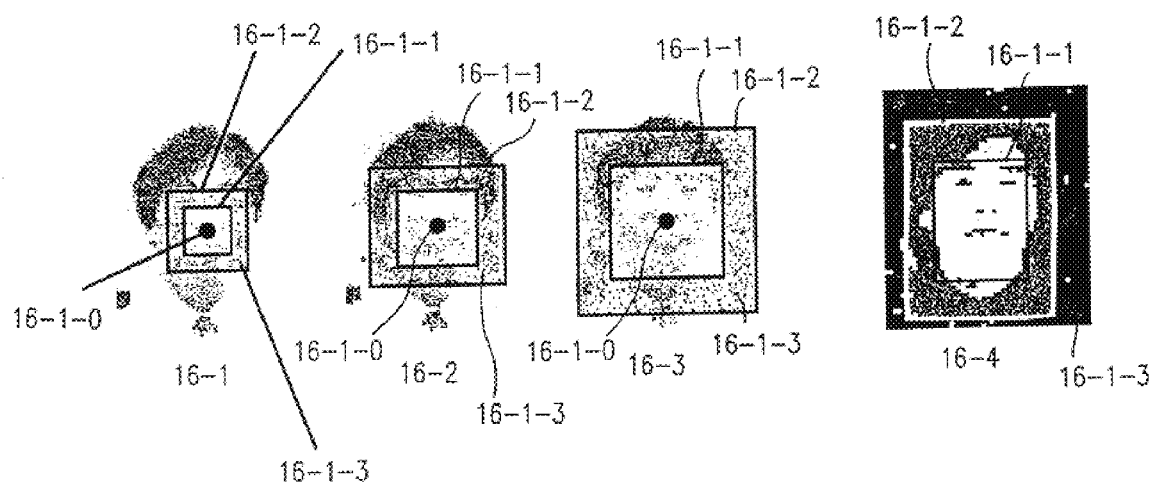
FIG. 16 is a diagram illustrating how the size of a window region is gradually increased.

Image processing procedure 4 is conducted after the image representing the face skin-region is obtained according to Image processing procedure 3. Referring to an image 16-1 in FIG. 16, in the case where only a position 16-1-0 is designated by the user, the image processing section 1-3 sets the smallest rectangle 16-1-1 centered around the designated point, and sets a region 16-1-3 located between the rectangle 16-1-1 and a slightly larger rectangle 16-1-2 as an initial window region. The image processing section 13 gradually magnifies the window region 16-1-3 as shown in images 16-2 and 16-3, until one of the four sides of the outer rectangle 16-1-2 of the window region 16-1-3 reaches the edge of the input image. Thereafter, the image processing section 1-3 calculates the dispersion of the pixels of the window region 16-1-3 in the image representing the face-skin region. The largest dispersion will be calculated when both the face skin and the contour of a part other than the face skin appear in the window region as shown in an image 16-4. Accordingly, during the operation of gradually magnifying the window region 16-1-3, the image processing section 1-3 determines the outer rectangle 16-1-2 corresponding to the largest dispersion, as a rectangle including the face skin region.

Figure 17:
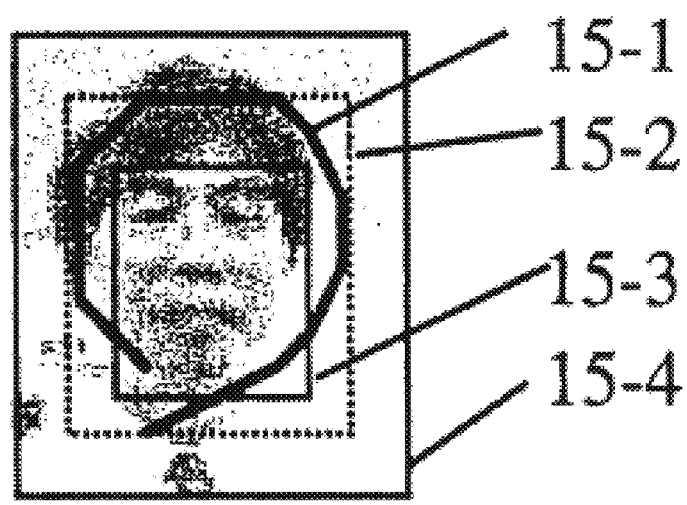
FIG. 17 shows an input pattern designated by the user.

As shown in FIG. 17, in the case where a region 15-1, not a position, is designated by the user, the image processing section 1-3 magnifies or reduces an outer rectangular defining a window region by an appropriate ratio to the size smaller than that of a rectangle 15-2 obtained from the designated region 15-1. Thus, the smallest rectangle 15-3 is obtained, whereby an initial window region is set such that the outer rectangle defining the window region corresponds to the rectangle 15-3. Thereafter, the image processing section 1-3 gradually magnifies the window region, until an inner rectangle of the window region becomes lager than a rectangle 15-4 magnified by an appropriate ratio from the rectangle 15-2. The image processing section 1-3 then calculates the dispersion of the pixels within the window region in a similar manner, and determines the outer rectangle corresponding to the largest dispersion, as a rectangle including the face-skin region. It should be noted that, provided that the region designated by the user is only slightly shifted from the face region, the rectangle magnified by an appropriate ratio from the rectangle obtained from the designated region may be determined as the rectangle including the face-skin region.

[Image processing procedure 5]

Figure 18:
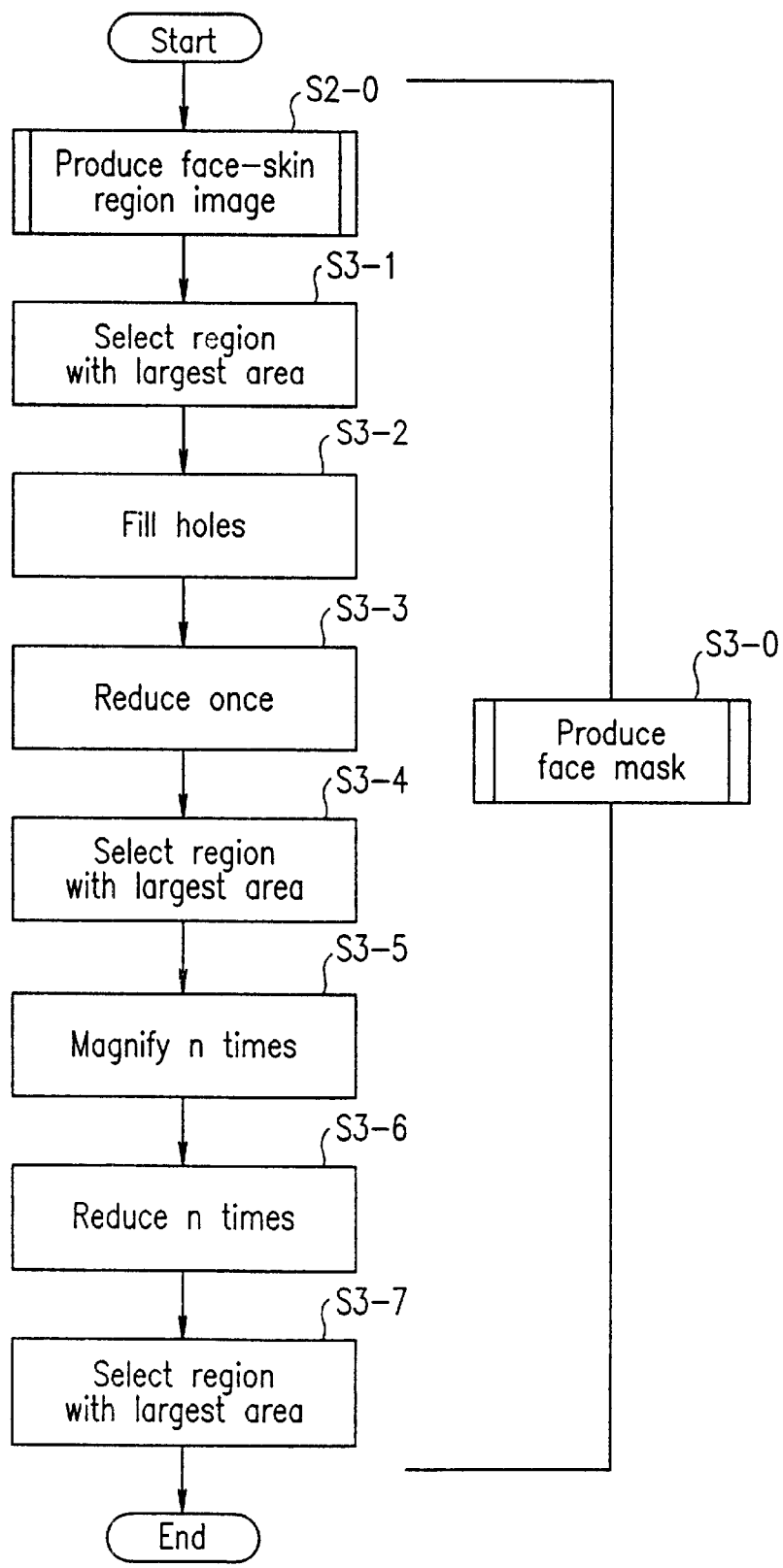
FIG. 18 is a flow chart illustrating Image processing procedure 5 for producing a face mask by the image processing apparatus of the example shown in FIG. 1.
Figure 19:
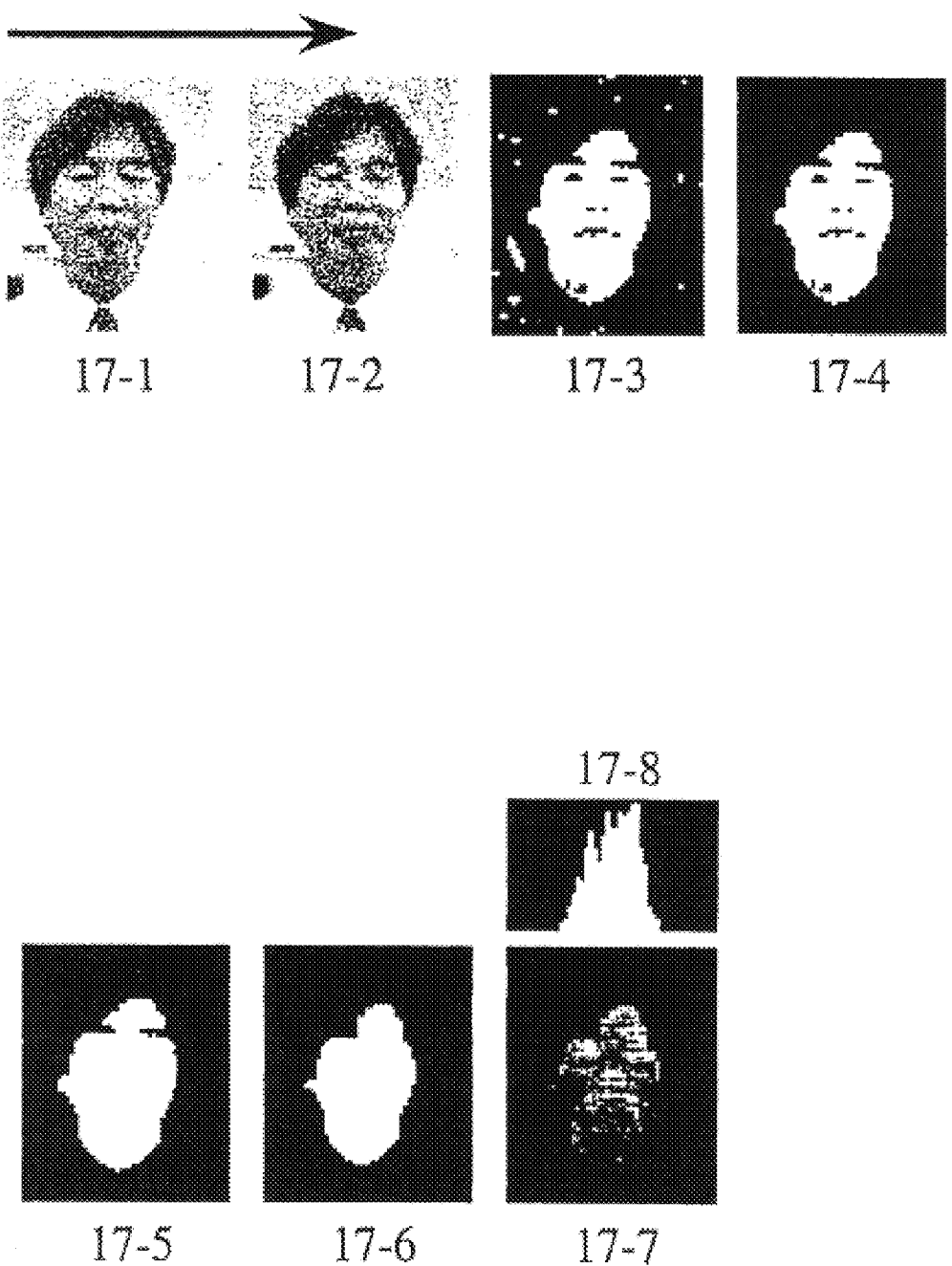
FIG. 19 illustrates how the face mask is produced.

FIG. 18 is a flow chart showing Image processing procedure 5 conducted by the image processing section 1-3. The image processing section 1-3 processes an input color image 17-1 shown in FIG. 19 according to Image processing procedure 4 to obtain a rectangle including a face-skin region 17-2. The image processing section 1-3 processes that rectangle according to Image processing procedure 3 to obtain an image 17-3 representing a face skin region as shown in FIG. 19. The image processing section 1-3 combines the pixels connected to each other in the face-skin region image 17-3 to produce a label image. The image processing section 1-3 then extracts only a label region having the largest area from the produced label image, and forms a binary image 17-4 from the label region (Step S3-1). Regarding the image 17-4, the image processing section 1-3 replaces black pixels (holes) surrounded by white pixels with white pixels to fill the holes. As a result, an image 17-5 is formed (Step S3-2). The image processing section 1-3 first reduces the size of the image 17-5 once (Step S3-3), and again produces a label image. The image processing section 1-3 extracts only a label region having the largest area from the label image (Step S3-4). After magnifying the resultant image n times (Step S3-5), the image processing section 1-3 reduces the size of the image n times (Step S3-6), and extracts only a label region having the largest area from the resultant label image (Step S3-7). Thus, a face mask 17-6 is obtained.

In the above steps, n should be set to, for example, 3 or 4 depending upon the size, characteristics or the like of the image. The magnifying and reducing processing as described above is described in the above-cited reference: "Robot Vision" by M. Yachida.

Figure 20:
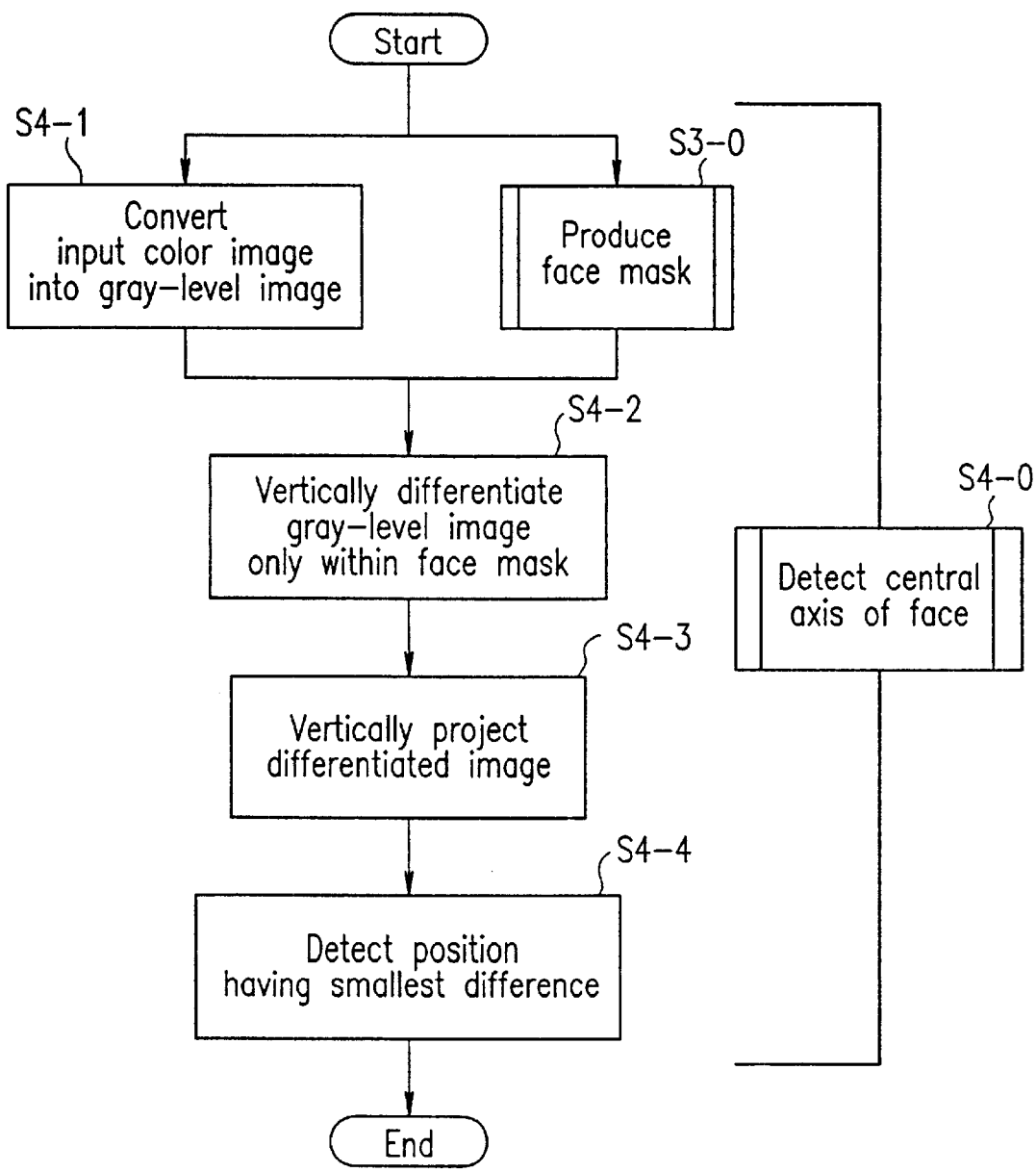
FIG. 20 is a flow chart illustrating the process for detecting the central axis of the face.

The face mask 17-6 thus obtained is used to define the range to be subjected to the processing according to the flow chart shown in FIG. 20. The image processing section 1-3 extracts only luminance components from the input color image 17-1 to obtain a gray-level image 17-2 (Step S4-1). At the same time, the image processing section 1-3 produces the face mask 17-6 according to the flow chart in FIG. 18 (Step S3-0). The image processing section 1-3 differentiates the gray-level image 17-2 in a vertical direction with respect to the white pixels in the face mask 17-6 to obtain a differentiated image 17-7 (Step S4-2). In the image 17-7, those pixels corresponding to the black pixels in the face mask 17-6 are set to zero. Such a differentiated image is commonly obtained by using, for example, a Prewitt's operator (the above-cited reference: "Robot Vision" by M. Yachida).

Figure 21:
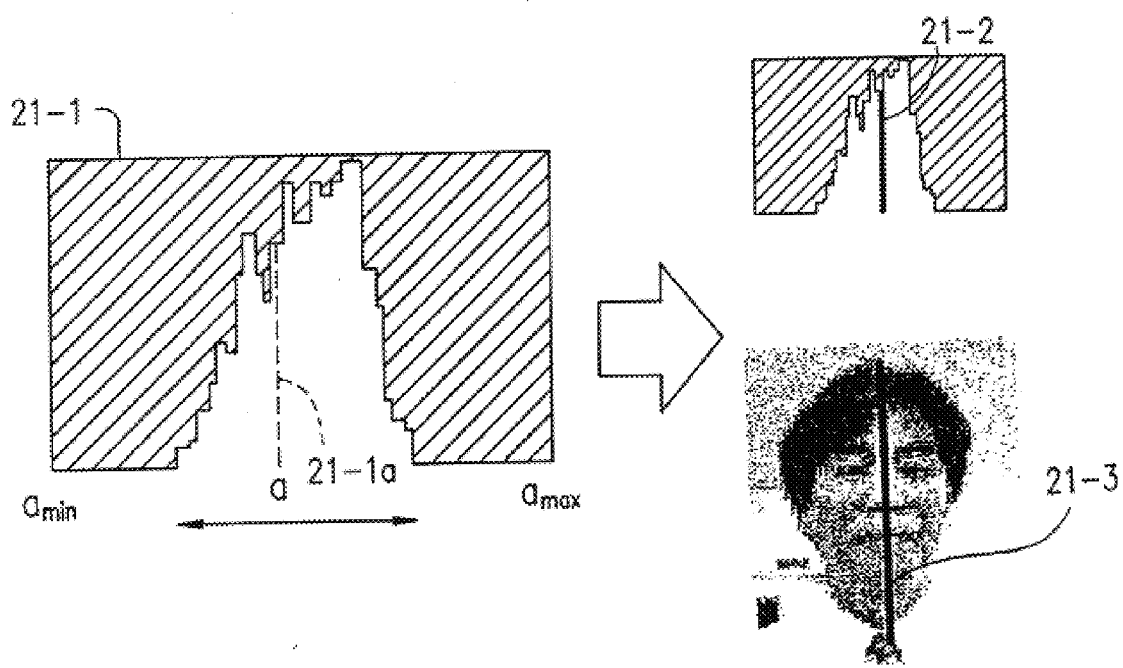
FIG. 21 is a diagram illustrating the process for detecting the central axis of the face.

The image processing section 1-3 projects the image 17-7 in a vertical direction to obtain a histogram 17-8 (Step S4-3). A vertical axis of the histogram 17-8 shows the sum of the pixel values of the image 17-7 at a corresponding horizontal position. Referring to FIG. 21, the image processing section 1-3 sets such a vertical axis 21-1a that horizontally divides the histogram 21-1 into two regions: right and left regions. The image processing section 1-3 obtains such an axis 21-2 that has the smallest value of SSDS given by the following expression:

$$SSDS = \sum_{i=1}^{(a-i) > a_{\min} \text{ and } (a+i) < a_{\max}} \{(f(a-i) - f(a+i))^2\}$$

where a indicates a position of the axis 21-1a, $a_{min}$ indicates a left end of the histogram, $a_{max}$ indicates a right end of the histogram, and f(s) indicates a height of the histogram (Step S4-4). Then, the image processing section 1-3 sets the position 21-4 2 as a central axis 21-3 of the face.

[Image processing procedure 6]

Figure 22:
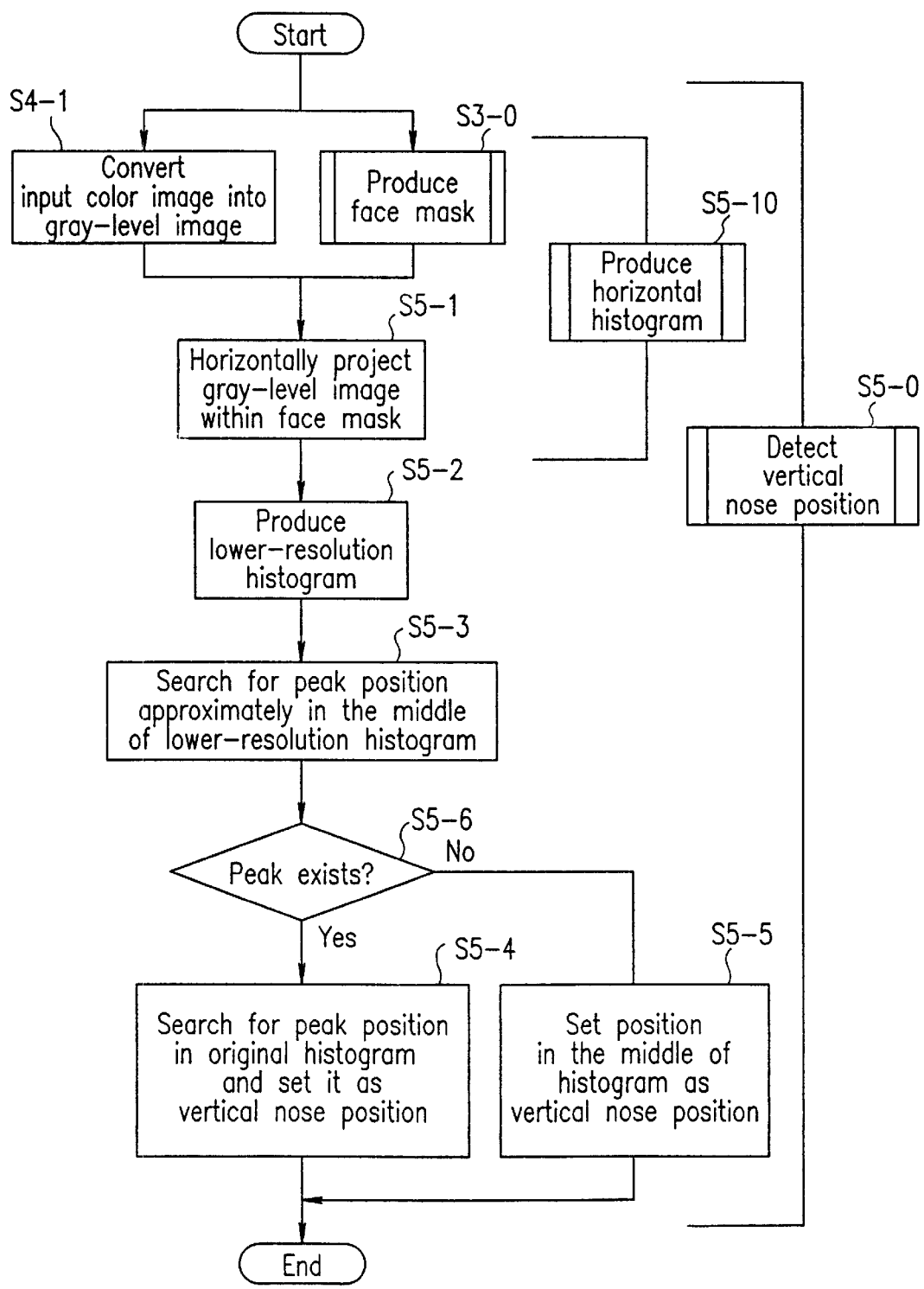
FIG. 22 is a flow chart illustrating Image processing procedure 6 for detecting a vertical position of the nose by the image processing apparatus of the example shown in FIG. 1.

FIG. 22 is a flow chart illustrating Image processing procedure 6 performed by the image processing section 1-3. The image processing section 1-3 produces the gray-level image 17-2 and the face mask 17-6 based on the image 17-1 as shown in FIG. 23 (Steps S4-1 and S3-0). The image processing section 1-3 horizontally scans only the gray-level image within the face mask 17-6 to produce a histogram 18-1 projecting a mean luminance value (Step S5-1). The image processing section 1-3 then produces a histogram 18-2 having a reduced resolution from the histogram 18-1 (Step S5-2), and searches for a peak position 18-2-1 approximately in the middle of the lower-resolution histogram 18-2 (Step S5-3). In the case where no peak is found (Step S5-6, No), the image processing section 1-3 sets the position in the middle of the histogram as a vertical nose position (Step S5-5). In the case where any peak is found (Step S5-6, Yes), the image processing section 1-3 scans a region around the position of the histogram 18-1 corresponding to the detected peak of the lower-resolution histogram 18-2, in order to search for a peak position 18-3-1 (Step S5-4). The image processing section 1-3 sets this peak position 18-3-1 as the vertical nose position (Step S5-0).

[Image processing procedure 7]

Figure 24:
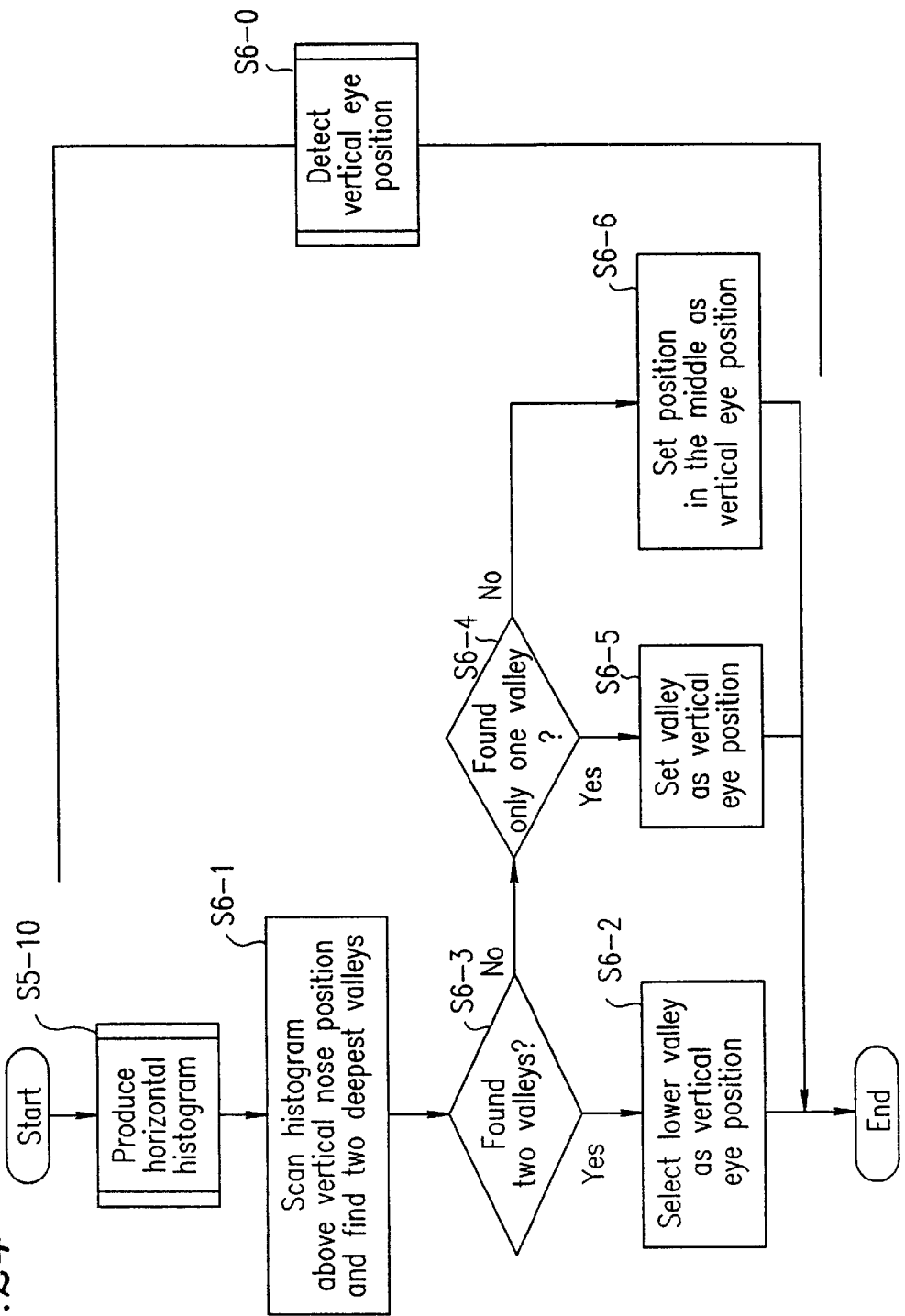
FIG. 24 is a flow chart illustrating Image processing procedure 7 for detecting a vertical position of the eyes by the image processing apparatus of the example shown in FIG. 1.
Figure 25:
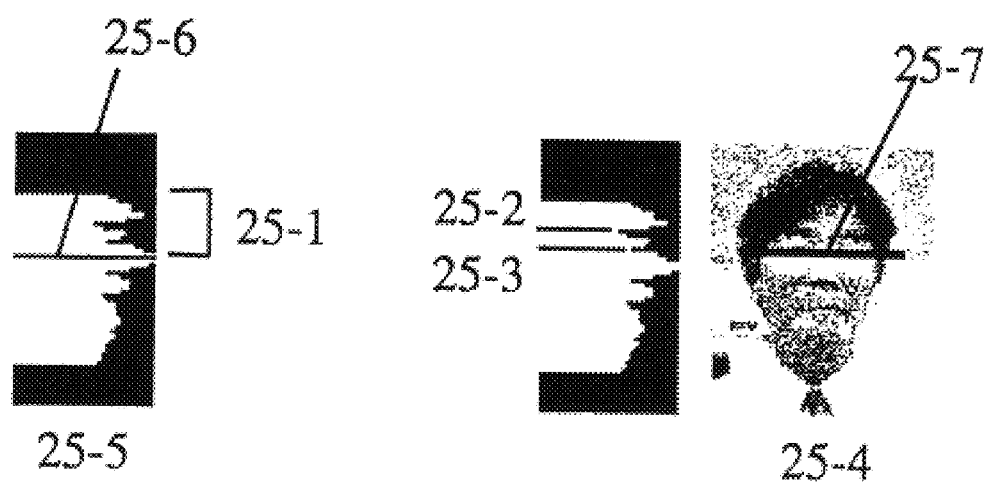
FIG. 25 is a diagram illustrating the process for detecting the vertical position of the eyes.

FIG. 24 is a flow chart illustrating Image processing procedure 7 conducted by the image processing section 1-3. The image processing section 1-3 produces a horizontal histogram 25-5 as shown in FIG. 25 according to Image processing procedure 6 (Step S5-10). Using this histogram 25-5, the image processing section 1-3 scans a region 25-1 above a vertical nose position 25-6 detected in Image processing procedure 6 to detect the deepest two valleys 25-2 and 25-3 (Step S6-1). In the case where the two valleys are both detected (Step S6-3), the image processing section 1-3 sets the lower one of the valleys, that is, the valley 25-3 as a vertical position 25-7 of the eyes (Step S6-2). In the case where only one valley is detected (Step S6-4), the image processing section 1-3 sets the detected valley as the vertical eye position (Step S6-5). In the case where no valley is detected, the image processing section 1-3 sets the position in the middle of the region between the vertical nose position and the upper end of the histogram 25-5 as the vertical eye position (Step S6-6).

[Image processing procedure 8]

Figure 26:
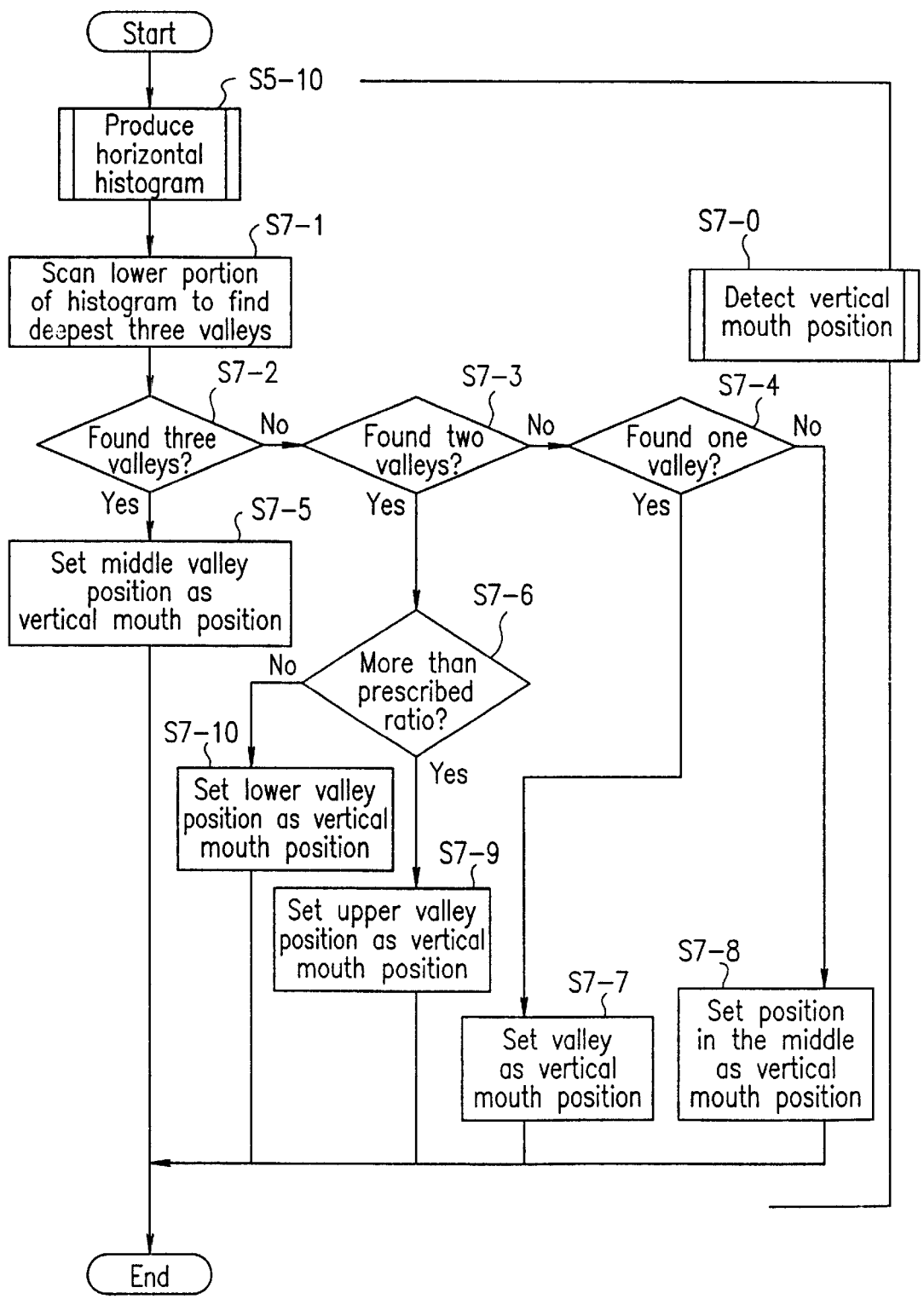
FIG. 26 is a flow chart illustrating Image processing procedure 8 for detecting a vertical position of the mouth by the image processing apparatus of the example shown in FIG. 1.
Figure 27:
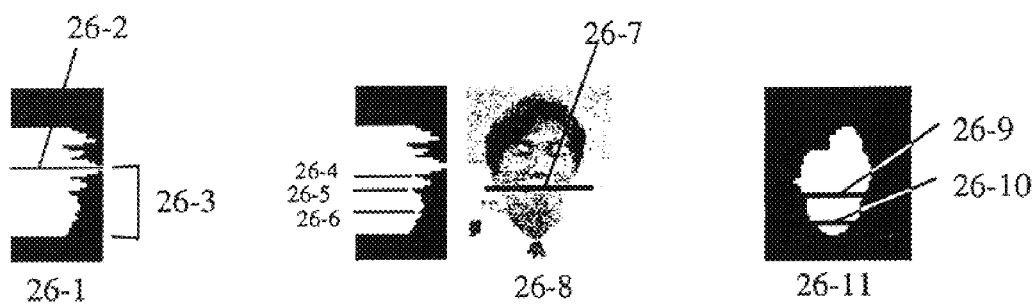
FIG. 27 is a diagram illustrating the process for detecting the vertical position of the mouth.

FIG. 26 is a flow chart illustrating Image processing procedure 8 conducted by the image processing section 1-3. The image processing section 1-3 produces a horizontal histogram 26-1 as shown in FIG. 27 according to Image processing procedure 6 (Step S5-10). Using the histogram 26-1, the image processing section 1-3 scans a region 26-3 below the vertical nose position 26-2 detected in Image processing procedure 6 to detect the deepest three valleys 26-4, 26-5 and 26-6 (Step S7-1). In the case where the three valleys are detected (Step S7-2), the image processing section 1-3 sets the middle one of the valleys, that is, the valley 26-5 as a vertical position 26-7 of the mouth (Step S7-5), as shown in an image 26-8.

In the case where only two valleys are detected (Step S7-3), the image processing section 1-3 first detects the widths of a face mask 26-11 at the two valleys. Then, the image processing section 1-3 calculates the ratio of the width 26-10 of the face mask 26-11 at the lower valley to the width 26-9 at the upper valley. In the case where the calculated ratio is higher than a prescribed value (e.g., 0.7) (Step S7-6), the image processing section 1-3 sets the position of the upper valley as a vertical mouth position (Step S7-9). Otherwise, the image processing section 1-3 sets the position of the lower valley as the vertical mouth position (Step S7-10).

In the case where only one valley is detected (Step S7-4), the image processing section 1-3 sets the position of the detected valley as the vertical mouth position (Step S7-7).

In the case where no valley is detected, the image processing section 1-3 sets the position in the middle of the region between the vertical nose position and the lower end of the histogram 26-1 as the vertical mouth position (Step S7-8).

[Image processing procedure 9]

Figure 28:
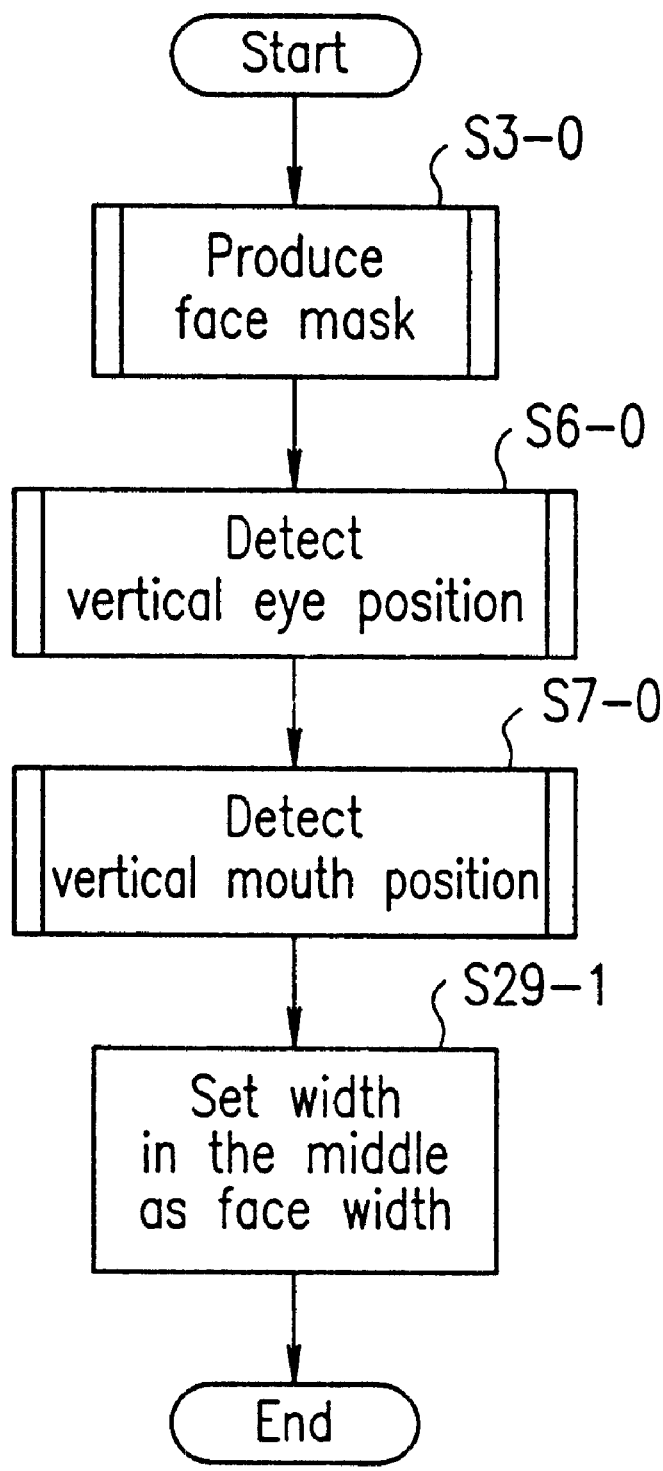
FIG. 28 is a flow chart illustrating Image processing procedure 9 for detecting a width of a face mask by the image processing apparatus of the example shown in FIG. 1.
Figure 29:
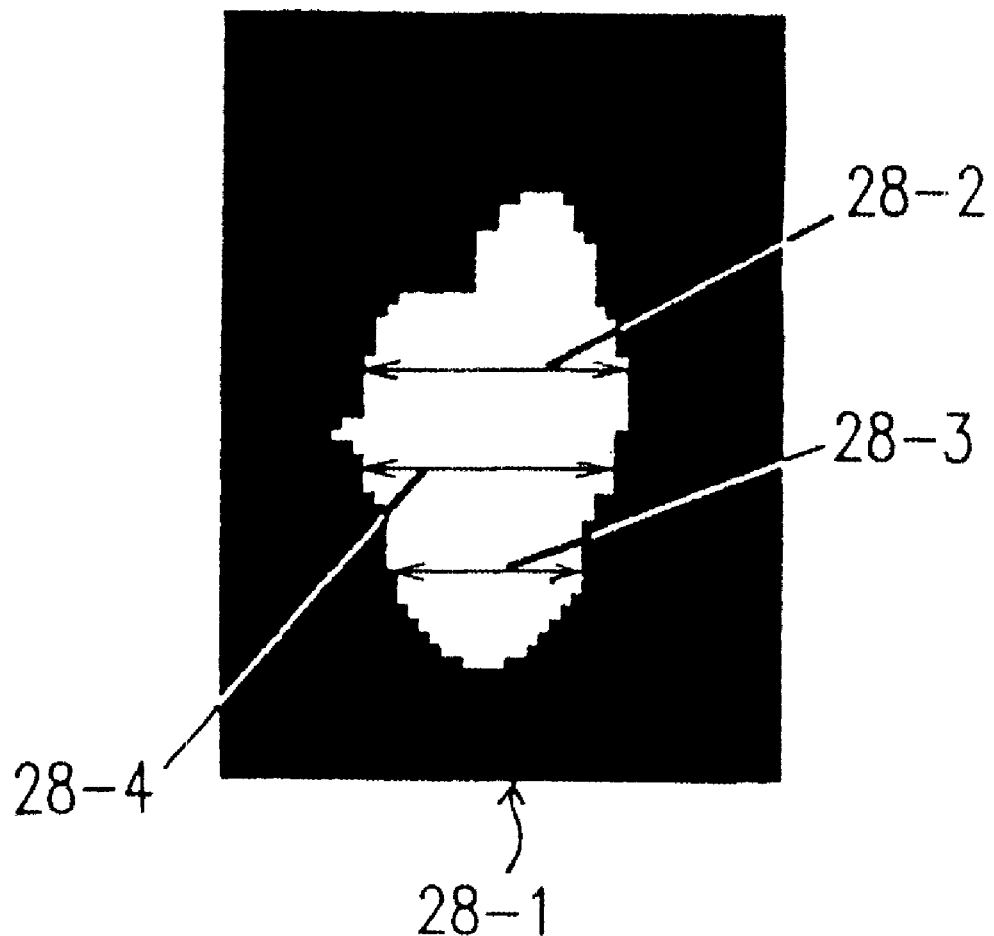
FIG. 29 is a diagram illustrating the process for detecting the width of the face mask.

FIG. 28 is a flow chart illustrating Image processing procedure 9 conducted by the image processing section 1-3. As shown in FIG. 29, a face mask 28-1, a vertical eye position 28-2 and a vertical mouth position 28-3 are obtained according to Image processing procedures 7 and 8 (Steps S3-0, S6-0 and S7-0). The image processing section 1-3 horizontally scans the pixels from the vertical eye position 28-2 to the vertical mouth position 28-3 in order to obtain a width of the face mask 28-1. The image processing section 1-3 obtains a width in the middle of the region between the vertical positions 28-2 and 28-3 as a width 28-4 of the face (Step S29-1).

[Image processing procedure 10]

Figure 30:
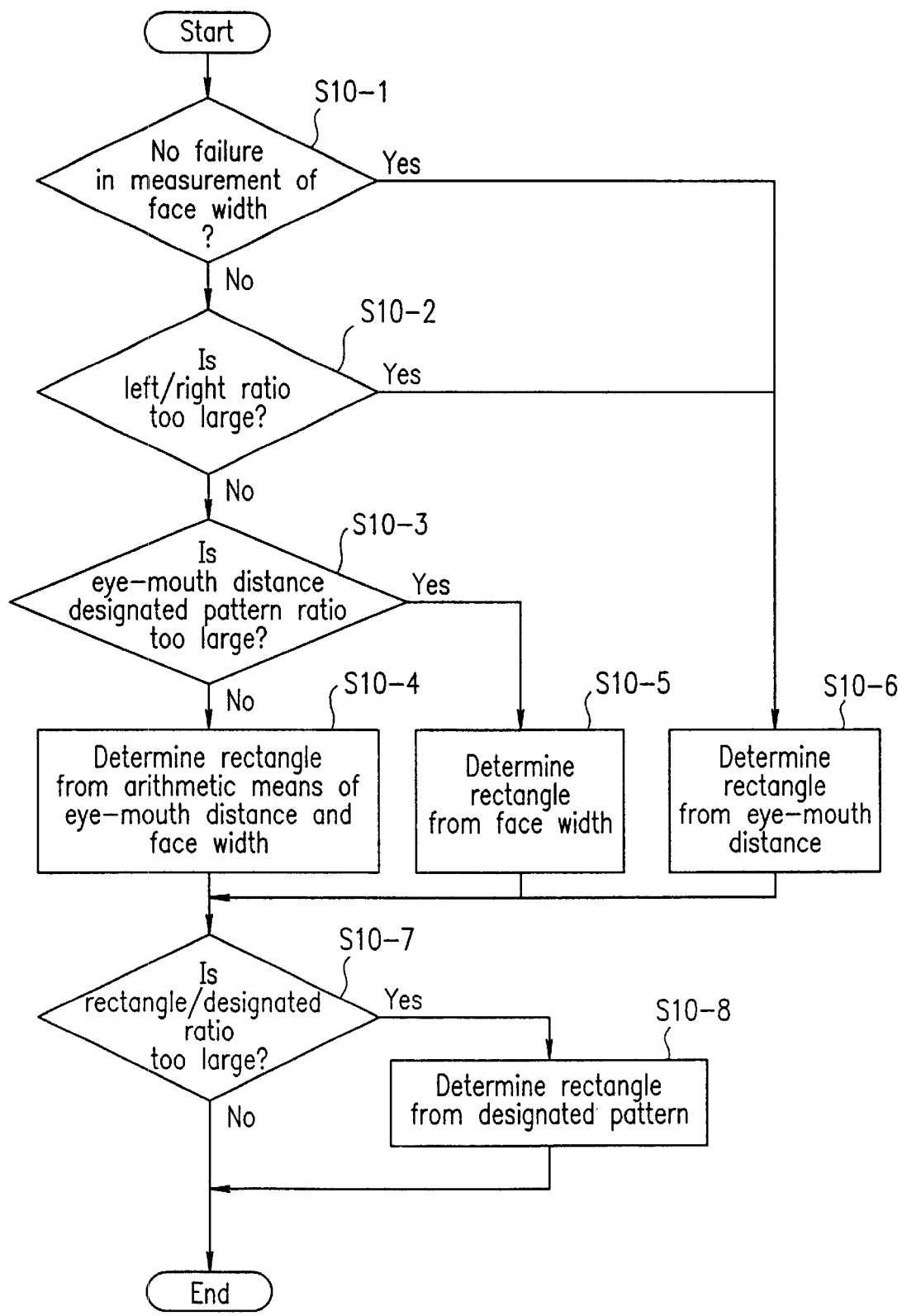
FIG. 30 is a flow chart illustrating Image processing procedure 10 for cutting out a rectangular image from the original image by the image processing apparatus of the example shown in FIG. 1.

FIG. 30 is a flow chart illustrating Image processing procedure 10 conducted by the image processing section 3-1. the face mask, the central axis of the face, the vertical eye position, the vertical mouth position, and the width of the face are detected according to Image processing procedures 5, 6, 7, 8 and 9. The distance between the eyes and the mouth can be obtained from the vertical eye position and the vertical mouth position. Using such information, the image processing section 1-3 cuts out an image which includes a face having an appropriate size and located at a well-balanced position in the horizontal and vertical directions, from the original image.

First, the image processing section 1-3 determines whether or not the detected width of the face is reliable. The width of the face is detected according to Image processing procedure 9, and the central axis of the face is detected according to Image processing procedure 5. Accordingly, the width of the face is divided into two widths by the central axis. A width on the left side of the central axis is herein referred to as a left-face width, whereas a width on the right side of the central axis is herein referred to as a right-face width. The image processing section 1-3 verifies that the left-face width and the right-face width are not zero (Step S10-1). Then, the image processing section 1-3 calculates the ratio of the left-face width to the right-face width to determine whether or not the calculated ratio is within a prescribed threshold-range (Step S10-2). In the case where the ratio is not within the threshold-range (Step S10-2, Yes), the image processing section 1-3 determines that the detected width of the face is not reliable, and determines a rectangle to be cut out from the detected eye-mouth distance (Step S10-6). More specifically, the image processing section 1-3 sets the intersection of the central axis of the face and the vertical nose position as a reference point. Then, the image processing section 1-3 calculates a rectangle centered around the reference point and having a width and length each calculated as a product of the eye-mouth distance and a respective prescribed ratio (Step S10-6). Thus, the rectangle to be cut out is obtained.

In the case where the width of the face is reliable (Step S10-2, No), the image processing section 1-3 determines whether or not the detected eye-mouth distance is reliable (Step S10-3). The image processing section 1-3 calculates the ratio of the detected eye-mouth distance to the length of the detected rectangle circumscribing a pattern designated by the user, and determines whether or not the calculated ratio is within a prescribed threshold-range (Step S10-3, No). Note that in the case where a position, not a region, is designated by the user, the image processing section 1-3 calculates the ratio of the detected eye-mouth distance to a rectangle reduced by a prescribed ratio from the face-skin region obtained according to Image processing procedure 4. In the case where the ratio is not within the threshold-range, the image processing section 1-3 determines that the detected vertical eye position and the detected vertical mouth position (and the detected eye-mouth distance) are not reliable, and determines a rectangle to be cut out from the detected width of the face. More specifically, the image processing section 1-3 sets as a reference point the intersection of the detected central axis of the face and the vertical center line of the rectangle circumscribing the pattern designated by the user. Then, the image processing section 1-3 calculates a rectangle centered around the reference point and having a width and length each calculated as a product of the width of the face and a respective prescribed ratio. Thus, the rectangle to be cut out is obtained (Step S10-5).

In the case where both the width of the face and the eye-mouth distance are reliable (Step S10-3, Yes), the image processing section 1-3 determines a rectangle to be cut out from these two values. More specifically, the image processing section 1-3 sets the intersection of the detected central axis of the face and the vertical nose position as a reference point, and calculates weighted arithmetic mean values by respectively multiplying the width of the face and the eye-mouth distance by a prescribed ratio. Then, the image processing section 1-3 calculates a rectangle centered around the reference point and having a width and length each calculated as a product of the respective calculated arithmetic mean value and a respective prescribed ratio (Step S10-4). Thus, a rectangle to be cut out is obtained.

Finally, the image processing section 1-3 calculates the ratio of the size of the rectangle thus obtained to the size of the rectangle circumscribing the pattern designated by the user, and determines whether or not the calculated ratio is within a prescribed threshold-range (Step S10-7). In the case where the ratio is not within the threshold-range, the image processing section 1-3 determines that the obtained rectangle is not appropriate, and determines a rectangle from the pattern designated by the user. More specifically, in the case where a region is designated by the user, the image processing section 1-3 sets the center of a rectangle circumscribing the region as a reference point. Then, the image processing section 1-3 calculates a rectangle centered around the reference point and having a width and length each calculated as a product of the length of the circumscribing and a respective prescribed ratio (Step S10-8). Thus, the rectangle to be cut off is obtained. In the case where a position is designated by the user, the center of the rectangle including a face skin region obtained according to Image processing procedure 4 is used as a reference point, and similar processing is carried out to obtain a rectangle to be cut out.

[Image processing procedure 11]

The image processing section 1-3 magnifies or reduces the face image which is cut out according to Image processing procedure 10 to an appropriate size, and stores the resultant image in the output image storing section 1-2-3 of the storage apparatus 1-2. The image processing section 1-3 can utilize the stored face image for appropriate applications such as an address book in a portable information tool. For example, the image processing section 1-3 stores an image of a person obtained by a digital camera, such as an image 30-1 as shown in FIG. 31, in the input image storing section 1-2-1, and roughly designates a portion in and around the face using the image coordinate input apparatus 1-1. Then, the image processing section 1-3 cuts out an image including the face at a well-balanced position from the original image according to Image processing procedure 10, and magnifies or reduces the resultant image to fit a prescribed frame. Thus, the resultant image is attached to a document, as shown by an image 30-2 of FIG. 31. The image 30-2 is a sheet of the address book with the face image being attached thereto.

[Image processing procedure 12]

A face mask is obtained according to Image processing procedure 12. In order to improve the visual recognition of the face in the image, the image processing section 1-3 of the present example appropriately processes only a portion of the input image corresponding to a white-pixel region of the face mask to make the image characteristics of the face-skin region and the other regions different from each other. Alternatively, in order to improve the visual recognition of the face in the image, the image processing section 1-3 may appropriately process only a portion of the input image corresponding to a black-pixel region of the face mask to make the image characteristics of the face region and the other regions different from each other.

Figure 32:
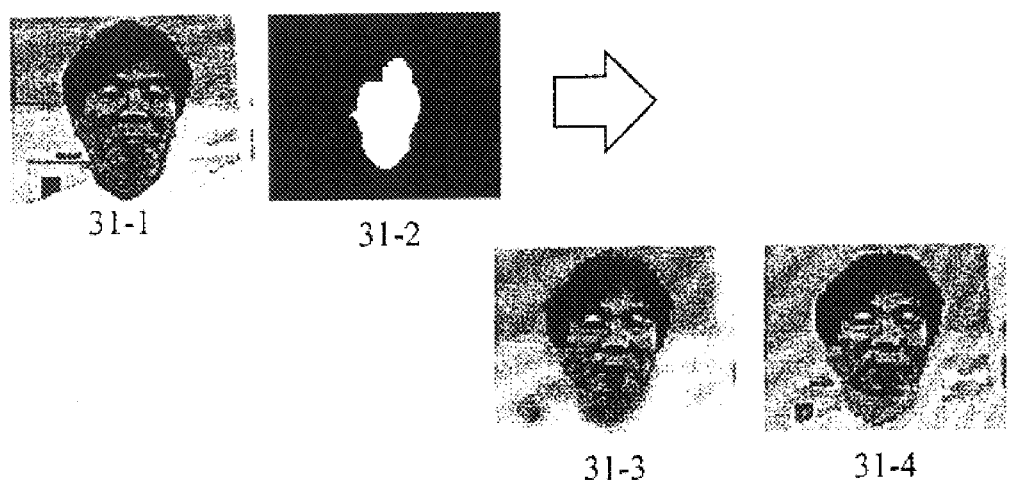
FIG. 32 is a diagram illustrating the process for correcting an image.

For example, FIG. 32 is a diagram illustrating the image correction processing. In the case where a face mask 31-2 is obtained from an input image 31-1, the image processing section 1-3 reduces the sharpness of the portion of the input image corresponding to the black-pixel region of the face mask 31-2, using a Gaussian filter or an averaging filter. As a result, an image 31-3 having reduced visual recognition of the background other than the face and having improved visual recognition of the face is obtained. In the case where the input image is not a sharp image, the image processing section 1-3 improves the visual recognition of the face by processing the portion of the input image corresponding to the white-pixel region of the face mask by, for example, edge sharpening. As a result, an image 31-4 is obtained. Similar effects may be obtained by reducing the contrast of the image, instead of reducing the sharpness of the regions other than the face region. In the case where the input image is a low-contrast image, similar effects may be obtained by increasing the contrast of the face-skin region. Alternatively, the contrast of the whole input image may be increased so that the portion of the input image corresponding to the white-pixel region of the face mask has the highest contrast.

According to the present invention, the user roughly designates a position (or a region) of the object in the original image, whereby an image which includes the object at a well-balanced position can be cut out from the original image.

In one example, the user roughly designates a position (or a region) of the object in the original image, whereby an image having a prescribed size and including the object at a well-balanced position can be output.

In one example, the user roughly designates a position (or a region) of the person's face in the image, whereby a region representing a face skin can be extracted.

In one example, the user roughly designates a position (or a region) of the person's face in the image, whereby a rectangle including a region representing the face skin can be obtained.

In one example, the user roughly designates a position (or a region) of the person's face in the image, whereby the central axis of the face can be detected.

In one example, the user roughly designates a position (or a region) of the person's face in the image, whereby a vertical position of the nose in the face can be detected.

In one example, the user roughly designates a position (or a region) of the person's face in the image, whereby a vertical position of the eyes in the face can be detected.

In one example, the user roughly designates a position (or a region) of the person's face in the image, whereby a vertical position of the mouth in the face can be detected.

In one example, the user roughly designates a position (or a region) of the person 's face in the image, whereby a width of the face can be detected.

In one example, the user roughly designates a position (or a region) of the person's face in the original image, whereby an image which includes the face at a well-balanced position can be cut out from the original image.

In one example, the user roughly designates a position (or a region) of the person's face in the image, whereby an image having a prescribed size and including the face at a well-balanced position can be output.

In one example, the user roughly designates a position (or a region) of the person's face in the image, whereby the image quality can be adjusted so that the visual recognition of the face is improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image processing apparatus, comprising:
an input image storing section for storing an original image to be processed;
a designating section for enabling a user to approximately designate an arbitrary image region contained in the original image or an arbitrary image position of an image contained in the original image, without designating a contour of an object region which is present in the user designated image region or position:
a specifying section for specifying the object region which is present in the user designated image region or position, and which can additionally be in and around a vicinity of the user designated image region or position, from pixel information in the user designated image region or position and pixel information which can additionally be in and around the vicinity of the user designated image region;
a determining section for determining an image region to be cut out from the original image, based on the specified object region and centered around the center of gravity of the object region; and
a cutting section for cutting out the determined image region from the original image.

2. An image processing apparatus according to claim 1, wherein
the determining section includes a section for adjusting a size of the image region to a prescribed size.

3. An image processing apparatus according to claim 1, wherein
the determining section includes a correcting section for entirely correcting the user designated image region or correcting only a part of the user designated image region.

4. An image processing apparatus, comprising:
an input image storing section for storing an original image to be processed;
a designating section for enabling a user to designate an arbitrary image region contained in the original image or an approximately arbitrary image position of an image contained in the original image, without designating a contour of a face image region which is present in the user designated image region or position;
an analyzing section for analyzing a color distribution in the user designated image region or position and in a vicinity of the user designated region or position:
an adjusting section for adjusting a condition for specifying the face image which is present in the image, according to a result of an analysis performed by the analyzing section;
a specifying section for specifying the face image region which is present in the user designated image region or position, and which can additionally be in and around the vicinity of the user designated image region or position, based on the adjusted condition;
a determining section for determining an image region to be cut out from the original image, based on the specified face image region and centered around the center of gravity of the object region; and
a cutting section for cutting out the determined image region from the original image.

5. An image processing apparatus according to claim 4, wherein the determining section includes a section for adjusting a size of the image region, using the user designated image region or the user designated image position as a reference.

6. An image processing apparatus according to claim 4, wherein
the specifying section includes:
a section for applying noise elimination or labelling to the specified face image region to produce a face mask;
a section for vertically scanning the produced face mask to obtain a sum of vertical differential luminance values of pixels in the image corresponding to the face mask to produce a histogram; and
a section for detecting a central axis of a face from a profile of the produced histogram.

7. An image processing apparatus according to claim 4, wherein
the specifying section includes:
a section for applying noise elimination or labelling to the specified face image region to produce a face mask;
a section for vertically scanning the produced face mask to obtain a mean luminance value of pixels in the image corresponding to the face mask to produce a histogram; and
a section for detecting a vertical nose position from a profile of the produced histogram.

8. An image processing apparatus according to claim 4, wherein the specifying section includes:
a section for applying noise elimination or labelling to the specified face image region to produce a face mask;
a section for horizontally scanning the produced face mask to obtain a mean luminance value of pixels in the image corresponding to the face mask to produce a histogram; and
a section for detecting a vertical eye position from a profile of the produced histogram.

9. An image processing apparatus according to claim 4, wherein
the specifying section includes
a section for applying noise elimination or labelling to the specified face image region to produce a face mask;
a section for horizontally scanning the produced face mask to obtain a mean luminance value of pixels in the image corresponding to the face mask to produce a histogram; and
a section for detecting a vertical mouth position from a profile of the produced histogram.

10. An image processing apparatus according to claim 9, wherein
the specifying section further includes
a section for detecting a vertical eye position from the profile of the produced histogram; and
a section for obtaining a middle position of a region between the detected vertical eye position and the detected vertical mouth position to detect a width of the face mask at the middle position.

11. An image processing apparatus according to claim 4, wherein
the determining section includes a section for adjusting a position of the image region, based on the face image region, a central axis of a face in the face image, a vertical nose position of the face in the face image, a vertical eye position of the face in the face image, a vertical mouth position of the face in the face image, and a width of a face mask of the face image.

12. An image processing apparatus according to claim 4, wherein the determining section includes a section for adjusting a size of the image region, based on the face image region, a central axis of a face in the face image, a vertical nose position of the face in the face image, a vertical eye position of the face in the face image, a vertical mouth position of the face in the face image, and a width of a face mask of the face image.

13. An image processing apparatus according to claim 4, wherein the determining section includes a correcting section for entirely correcting the user designated image region or correcting only a part of the user designated image region.

14. An image processing method, comprising the steps of:

inputting an original image to be processed;

a user approximately designating an arbitrary image region contained in the original image or an arbitrary image position of an image contained in the original image without designation of a contour of an object region which is present in the user designated image region or position;

specifying the object region which is present on the user designated image region or position, and which can additionally be in and around a vicinity of the user designated image region or position, from pixel information in the user designated image region or position and pixel information which can additionally be in and around the vicinity of the user designated image region;

determining an image region to be cut out from the original image, based on the specified object region and the center of gravity of the object region; and cutting out the determined image region from the original image.

15. The image processing method of claim 14, wherein the step of determining the image region to be cut out from the image section includes the step of adjusting a size of the image region to a prescribed size.

16. The image processing method of claim 14, wherein the step of determining the image region to be cut out from the image section includes the step of entirely correcting the user designated image region or correcting only a part of the user designated image region.

17. An image processing method, comprising the steps of:

inputting an original image to be processed;

a user approximately designating an arbotrary image region contained in the original image or an arbitrary image position of an image contained in the original image without designating a contour of a face image region which is present in the user designated image region or position;

analyzing a color distribution in the user designated image region or position and in a vicinity of the user designated image region or position:

adjusting a condition for specifying the face image which is present in the image, according to a result of the analyzing step;

specifying the face image region which is present in the user designated image region or position, and which can additionally be in and around the vicinity of the user designated image region or position, based on the adjusted condition;

determining an image region to be cut out from the original image, based on the specified face image region and the center of gravity of the object region; and cutting out the determined image region from the original image.

18. The image processing method of claim 17, wherein the step of determining the image region to be cut out from the image section includes the step of adjusting a size of the image region, using the user designated image region or the user designated image position as a reference.

19. The image processing method of claim 17, wherein the step of specifying the face image region includes the steps of:

applying noise elimination or labeling to the specified face image region to produce a face mask;

vertically scanning the produced face mask to obtain a sum of vertical differential luminance values of pixels in the image corresponding to the face mask to produce a histogram; and detecting a central axis of a face from a profile of the produced histogram.

20. The image processing method of claim 17, wherein the step of specifying the face image region includes the steps of:

applying noise elimination or labeling to the specified face image region to produce a face mask;

vertically scanning the produced face mask to obtain a mean luminance value of pixels in the image corresponding to the face mask to produce a histogram; and detecting a vertical nose position from a profile of the produced histogram.

21. The image processing method of claim 17, wherein the step of specifying the face image region includes the steps of:

applying noise elimination or labeling to the specified face image region to produce a face mask;

horizontally scanning the produced face mask to obtain a mean luminance value of pixels in the image correspinding to the face mask to produce a histogram; and detecting a vertical eye position from a profile of the produced histogram.

22. The image processing method of claim 17, wherein the step of specifying the face image region includes the steps of:

applying noise elimination or labeling to the speified face image region to produce a face mask;

horizontally scanning the produced face mask to obtain a mean luminance value of pixels in the image corresponding to the face mask to produce a histogram; and detecting a vertical mouth position from a profile of the produced histogram.

23. The image processing method of claim 22, wherein the step of specifying the face image region further includes the steps of:

detecting a vertical eye position from the profile of the produced histogram; and obtaining a middle position of a region between the detected vertical eye position and the dectected vertical mouth position to detect a width of the face mask at the middle position.

24. The image processing method of claim 17, wherein the step of determining the image region to be cut from the image section includes the step of adjusting a position of the image region, base on the face image region, a central axis of a face in the face imge, a vertical nose position of the face in the face image; a vertical eye position of the face in the face image, a vertical mouth position of the face in the face image, and a width of a face mask of the face image.

25. The image processing method of claim 17, wherein the step of determining the image region to be cut out from the image section includes the step of adjusting a size of the image region, based on the face image region, a central axis of a face in the face image, a vertical nose position of the face in the face image, a vertical eye position of the face in the face image, a vertical mouth position of the face in the face image, and a width of a face mask of the face image.

26. The image processing method of claim 17, wherein the step of determining the image region to be cut out from the image section inlcudes the step of entirely correcting the user designated image region or correcting only a part of the user designated image region.

* * * * *